(12) United States Patent
Gnazdowsky et al.

(10) Patent No.: US 10,789,054 B2
(45) Date of Patent: Sep. 29, 2020

(54) METHODS, SYSTEMS, APPARATUSES AND DEVICES FOR FACILITATING CHANGE IMPACT ANALYSIS (CIA) USING MODULAR PROGRAM DEPENDENCY GRAPHS

(71) Applicant: Find it EZ Software Corp., Kelowna (CA)

(72) Inventors: Kenneth Nicholas Joseph Gnazdowsky, West Kelowna (CA); Hao Men, Calgary (CA); Robert James Walker, Calgary (CA)

(73) Assignee: FIND IT EZ SOFTWARE CORP., Kelowna, BC (CA)

( * ) Notice: Subject to any disclaimer, the term of this patent is extended or adjusted under 35 U.S.C. 154(b) by 0 days.

(21) Appl. No.: 16/422,870

(22) Filed: May 24, 2019

(65) Prior Publication Data
US 2019/0361686 A1 Nov. 28, 2019

Related U.S. Application Data

(60) Provisional application No. 62/675,876, filed on May 24, 2018.

(51) Int. Cl.
*G06F 8/41* (2018.01)
*G06F 8/65* (2018.01)
*G06F 16/901* (2019.01)
(52) U.S. Cl.
CPC .............. *G06F 8/433* (2013.01); *G06F 8/65* (2013.01); *G06F 16/9024* (2019.01)

(58) Field of Classification Search
CPC ......... G06F 16/9024; G06F 8/433; G06F 8/65
See application file for complete search history.

(56) References Cited

U.S. PATENT DOCUMENTS

| 2012/0110557 | A1* | 5/2012 | Singh | G06F 8/75 717/133 |
| 2012/0254827 | A1* | 10/2012 | Conrad | G06F 8/35 717/104 |
| 2016/0034258 | A1* | 2/2016 | Wijngaard | G06F 8/73 717/123 |

* cited by examiner

*Primary Examiner* — Wei Y Zhen
*Assistant Examiner* — Amir Soltanzadeh

(57) ABSTRACT

Disclosed herein is a system for facilitating Change Impact Analysis (CIA) using modular program dependency graphs. Further, the system may include a communication device configured for receiving a source code for a software application and one or more changed lines corresponding to the source code from a user device, and transmitting one or more impacted lines from the source code associated with the software application to the user device. Further, the system may include a processing device configured for analyzing the source code to determine one or more modules, generating one or more modular Program Dependency Graphs (mPDGs) based on the analysis, updating at least one mPDG based on the one or more changed lines to obtain the at least one updated mPDG, searching the mPDG based on search expressions associated with the one or more changed lines, and calculating one or more impacted lines based on the searching.

18 Claims, 17 Drawing Sheets

METHODS, SYSTEMS, APPARATUSES AND DEVICES FOR FACILITATING CHANGE IMPACT ANALYSIS (CIA) USING MODULAR PROGRAM DEPENDENCY GRAPHS

The current application claims a priority to the U.S. Provisional Patent application Ser. No. 62/675,876 filed on May 24, 2018.

TECHNICAL FIELD

Generally, the present disclosure relates to the field of data processing. More specifically, the present disclosure relates to methods, systems, apparatuses and devices for facilitating change impact analysis (CIA) using modular program dependency graphs.

BACKGROUND

Many industrial software systems are written in multiple programming languages, for the sake of the specialized features each provides, and leverage various technologies for intercommunicating between the disparate parts. These systems are called as heterogeneous systems. Unfortunately, software development tools and underlying analysis techniques are created to operate in homogeneous environments. While versions could be built for heterogeneous systems in principle, practical limitations such as poor portability to novel combinations of languages/technologies, poor scalability to ever larger heterogeneous systems, and poor evolvability when an expensive analysis has to be repeated in its entirety for even small changes to the software system may arise.

All such issues may lead to prohibitively high costs when planning or implementing changes to enterprise-scale heterogeneous software systems, causing industrial development to fall back on error-prone, disconnected, and inefficient manual approaches to change impact analysis. Change impact analysis (CIA) may be described as the activity of identifying what to modify to accomplish a change, and/or of identifying the potential consequences of a change.

A wide range of automated approaches have been proposed to facilitate CIA. In practice, changing different statements, even within a same method, may lead to unexpected consequences in different places. For example, it is not uncommon that the same method be changed together with different other methods in different commits to a version control system. This means that the computed estimated impact sets must have been different when the initial method was changed. From this point of view, coarse-grained approaches are not suitable to perform CIA as coarse-grained approaches may abstract the differences at the statement level and always produce the same result.

Further, slicing has been promoted to address a variety of software engineering problems, including CIA. However, slicing includes multiple problems. For instance, slicing is specific to a programming language for which it is implemented. Slicing may be overly conservative, which may lead to parts of a software's source code being flagged as potentially impacted when the probability of the parts being impacted is too remote to be of practical value, leading to the need to discard a very large proportion of false positives.

Further, proposals for lighter weight concepts related to slicing (e.g., thin slicing) have been made that claim to better represent the needs of industrial developers. However, such claims are never supported with empirical evidence so are hard to judge.

Further, many purely structural approaches based on variations of call graph have been proposed, which have an advantage of being cheaper to build and analyze, and conforming to how industrial developers tend to investigate real impacts. However, call graphs may tend to ignore pointer analysis issues arising from polymorphism and aliasing.

Further, CIA techniques have also considered dynamic analysis and mutation analysis, but these include classic shortcomings of dynamic approaches (i.e., difficulties in ensuring that the state space is well covered) as well as high computational cost that may render dynamic analysis and mutation analysis as impractical.

Further, CIA techniques have also been based on the mining of software repositories in order to recover the probability of co-change of software artifacts. However, such techniques may require a stable history of co-changes to exist from which to extrapolate, and these techniques may include assumptions that artifact identities may not change, relationships detectable in the past may continue to be present in the future that new relationships may not arise. All of these assumptions are violated in typical industrial systems undergoing active development.

Therefore, there is a need for improved methods, systems, apparatuses and devices for facilitating change impact analysis (CIA) using modular program dependency graphs that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating Change Impact Analysis (CIA) using modular program dependency graphs, in accordance with some embodiments. Accordingly, the method may include receiving, using a communication device, a source code for a software application and one or more changed lines corresponding to the source code from a user device. Further, the method may include analyzing, using a processing device, the source code to determine one or more modules within the source code, called as modules, that may include syntactic elements specific to a programming language that possess a well-defined calling interface, e.g. function, procedure, method, subroutine. Further, the method may include generating, using the processing device, one or more modular Program Dependency Graphs (mPDGs) based on the analyzing. Further, an mPDG in the one or more mPDGs may correspond to a module of the one or more modules. Further, the method may include updating, using the processing device, at least one mPDG in the one or more mPDGs based on the one or more changed lines to obtain at least one updated mPDG. Further, the method may include searching, using the processing device, the mPDG based on search expressions associated with the one or more changed lines. Further, the method may include calculating, using the processing device, one or more impacted lines of the source code based on the searching. Further, the method may include transmitting, using the communication device, the one or more impacted lines from the source code associated with the software application to the user device.

Further disclosed herein is a system for facilitating Change Impact Analysis (CIA) using modular program dependency graphs, in accordance with some embodiments. Further, the system may include a communication device configured for receiving a source code for a software application and one or more changed lines corresponding to the source code from a user device. Further, the communication device may be configured for transmitting one or more impacted lines from the source code associated with the software application to the user device. Further, the system may include a processing device configured for analyzing the source code to determine one or more modules within the source code. Further, the processing device is configured for generating one or more modular Program Dependency Graphs (mPDGs) based on the analyzing. Further, an mPDG in the one or more mPDGs corresponds to a module of the one or more modules. Further, the processing device is configured for updating at least one mPDG in the one or more mPDGs based on the one or more changed lines to obtain the at least one updated mPDG. Further, the processing device is configured for searching the mPDG based on search expressions associated with the one or more changed lines. Further, the processing device is configured for calculating one or more impacted lines of the source code based on the searching.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
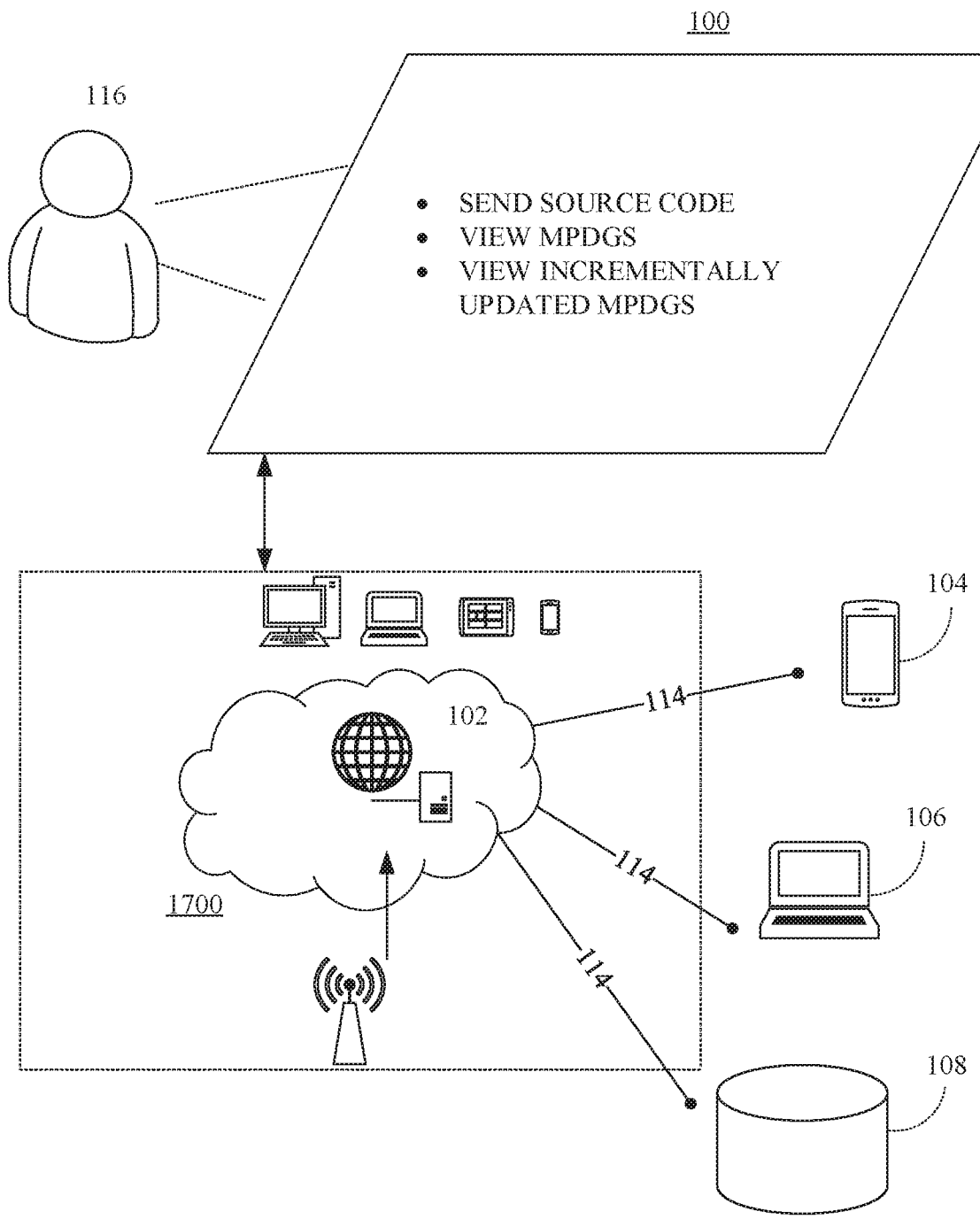
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of change impact analysis (CIA) using modular program dependency graphs, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

Change impact analysis involves taking a (potential or actual) change to a software system, and estimating where else in the software system may also need subsequent changes.

Many industrial software systems may be written in multiple programming languages, for the sake of the specialized features each provides, and leverage various technologies for intercommunicating between the disparate parts (heterogeneous systems). Unfortunately, software development tools and their underlying analysis techniques are created to operate in homogeneous environments. While versions could be built for heterogeneous systems in principle, practical limitations arise such as, poor portability to novel combinations of languages/technologies, poor scalability to ever larger heterogeneous systems, and poor evolvability when change impact analysis has to be repeated in its entirety for even small changes to the software system.

Static change impact analysis approaches consider only the source code (or object code or bytecode, etc.) without executing the program. These approaches have the advantage that they do not require test inputs to exercise them (unlike dynamic approaches) and they do not require historical information to see how the parts of a software system have co-evolved over time (unlike history-based approaches).

Static change impact analysis approaches come in two flavors: coarse-grained and fine-grained. Coarse-grained approaches are not concerned with dataflow and control flow analysis involving specific program variables, expressions, or statements, meaning that they are fast to compute but inaccurate. Fine-grained approaches do concern themselves with these details, meaning that they are more accurate. Fine-grained approaches that attempt to be sound are extremely expensive to compute and are not maintainable when small changes are made to the software system under analysis. We present an approach that subdivides its analysis into modules with minimal interconnections, allowing modifications to the software system under analysis to result in modifications to only the modules directly affected; this greatly reduces the time both to build the representation of the system and to modify it later.

Further, approaches disclosed herein have the added benefit that its modular nature supports heterogeneous software systems by subdividing its analysis into different languages (and language dialects), and permits the discovery of inter-modular connections that allow change impact analysis (fine-grained or coarse-grained) to cross language- and technology-barriers. Further, recommendation systems within the approach support a developer in adding support for new languages, dialects, and communication technologies used to interconnect modules written in different languages or dialects.

Further, the system may support static change impact analysis in both fine-grained and coarse-grained forms.

Further, the system may provide a novel modular approach permitting fast model construction, which may also support heterogeneous software systems by permitting software parts written in different languages to be represented by separate modules.

Figure 10:
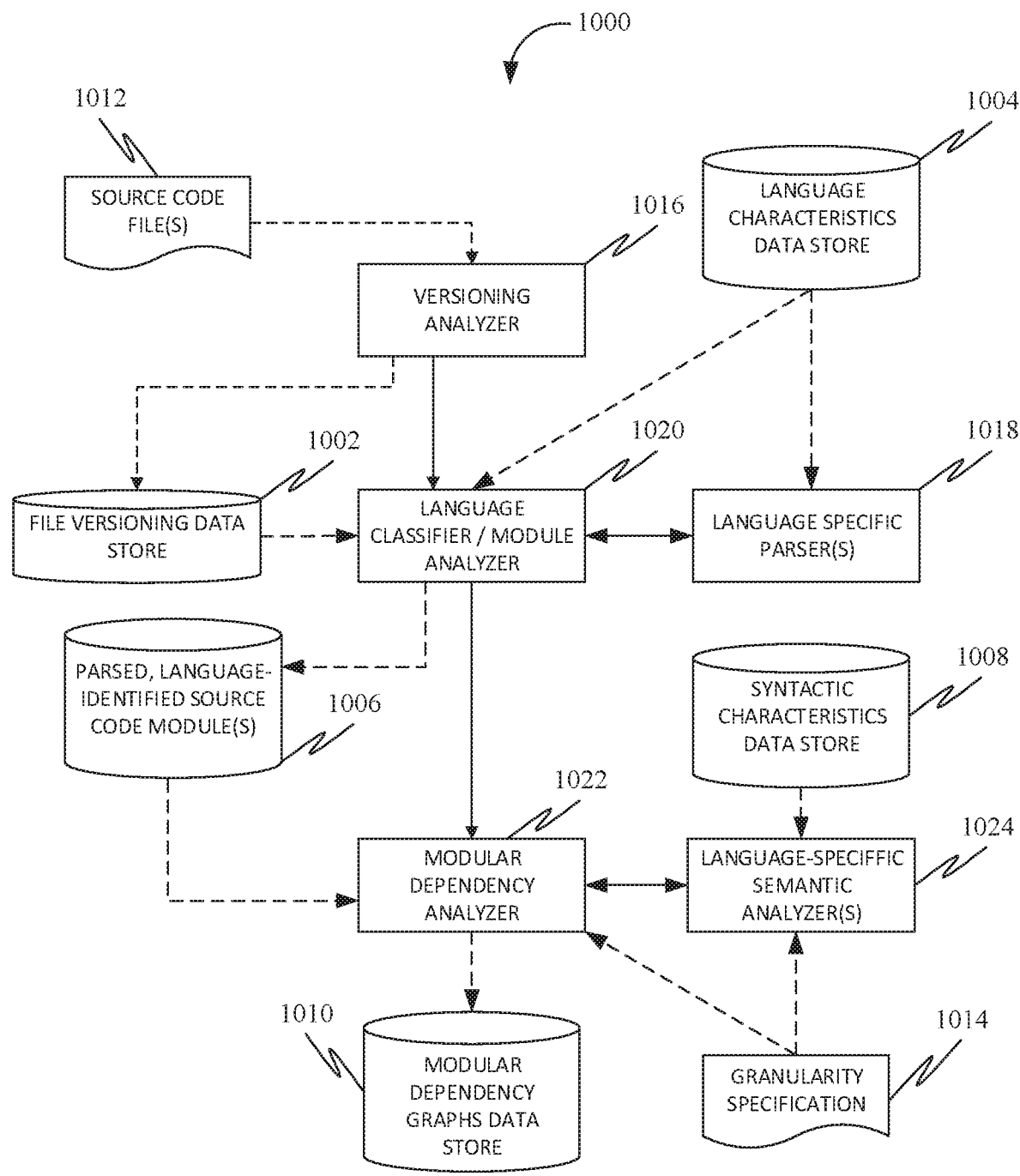
FIG. 10 is an exemplary representation of a system to facilitate modular dependency graph construction or update, in accordance with some embodiments.
Figure 11:
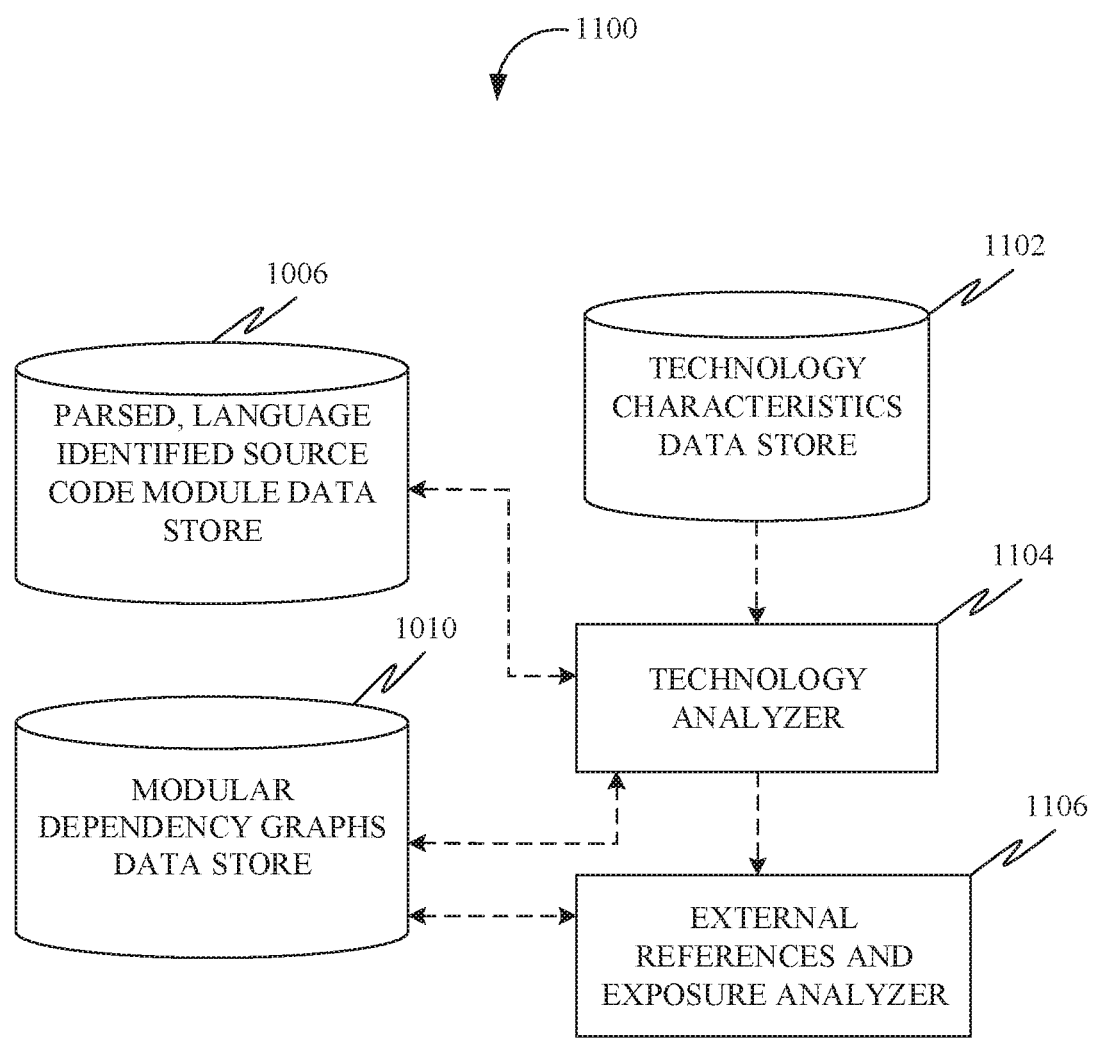
FIG. 11 is an exemplary representation of a system to facilitate annotation of dangling references and referable declarations for heterogeneous systems, in accordance with some embodiments.
Figure 12:
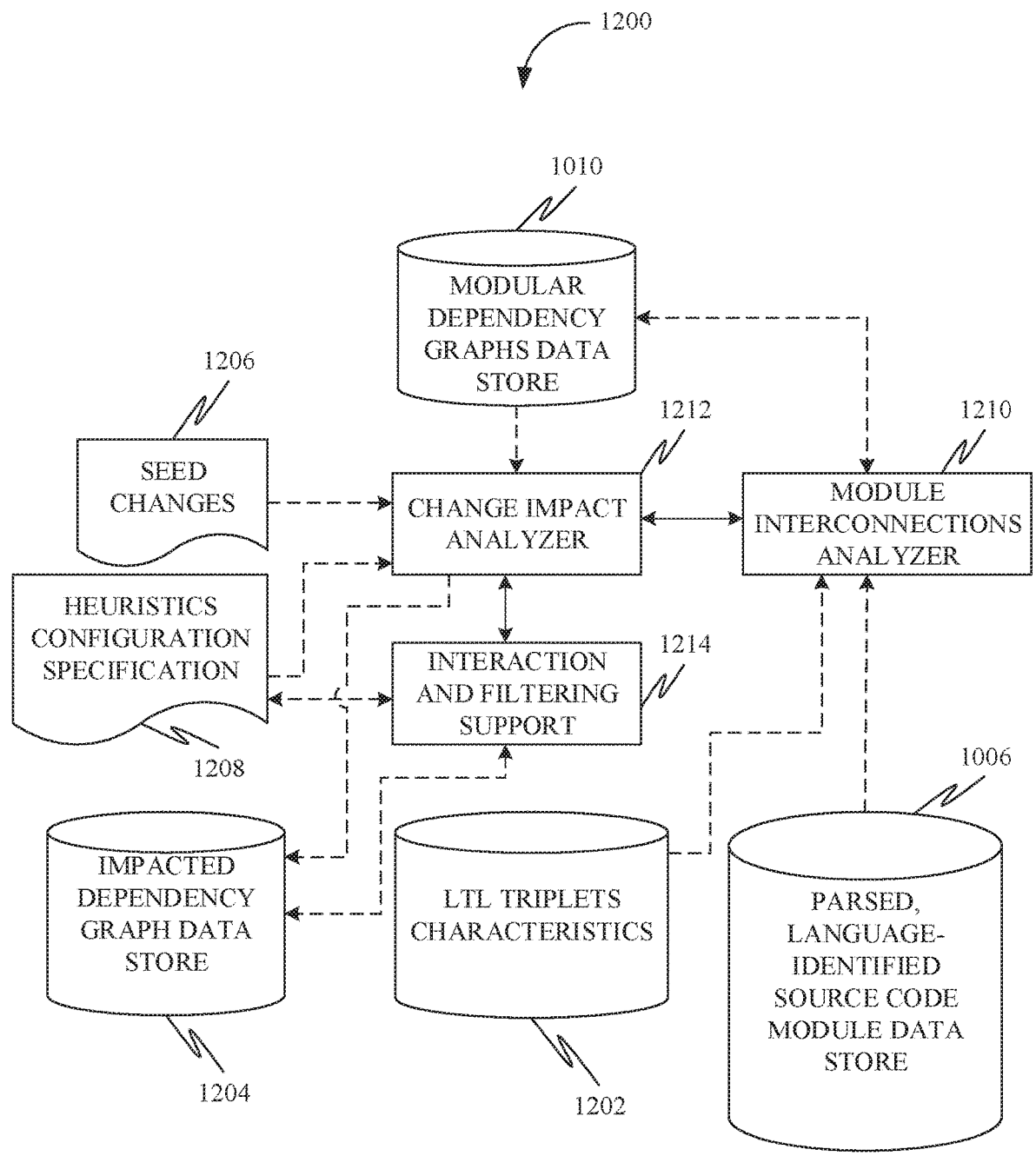
FIG. 12 is an exemplary representation of a system to facilitate change impact analysis for heterogeneous systems, in accordance with some embodiments.
Figure 13:
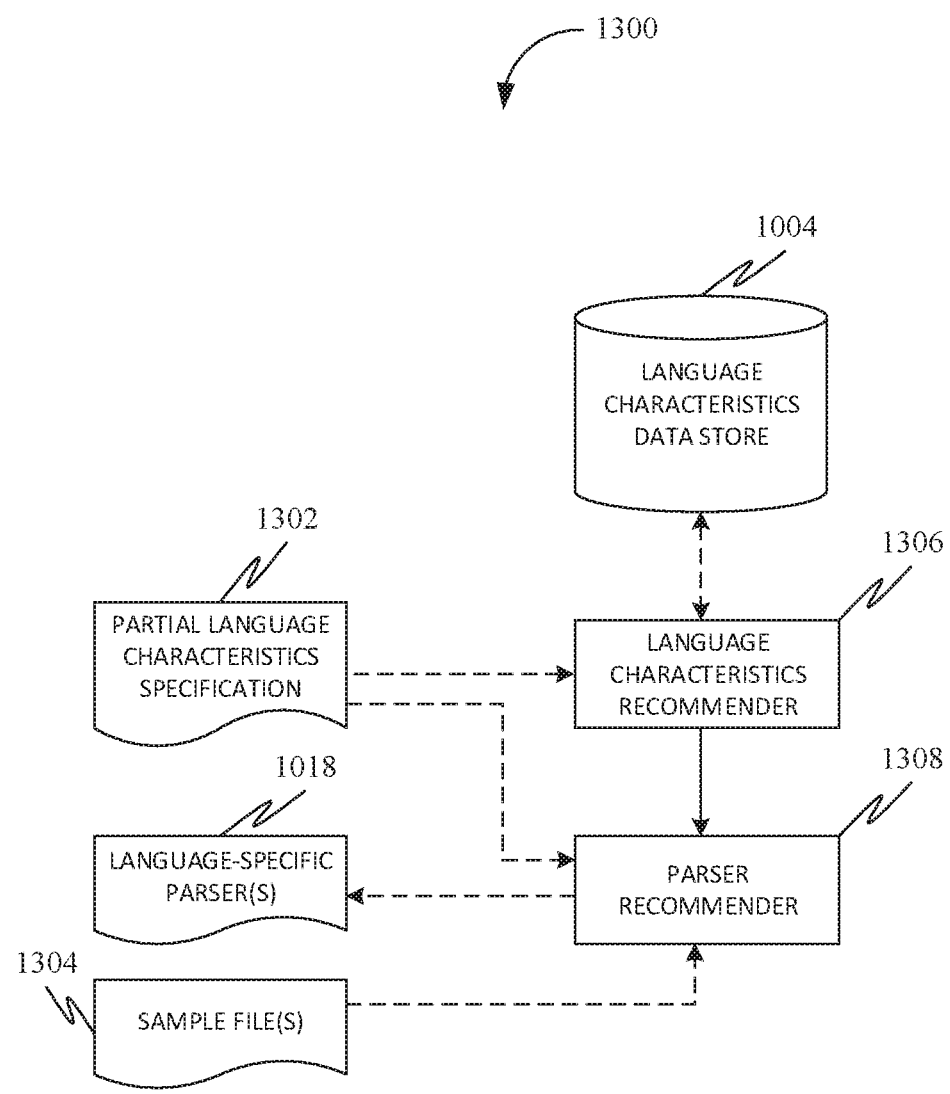
FIG. 13 is an exemplary representation of a recommendation system for language characteristics support, in accordance with some embodiments.
Figure 14:
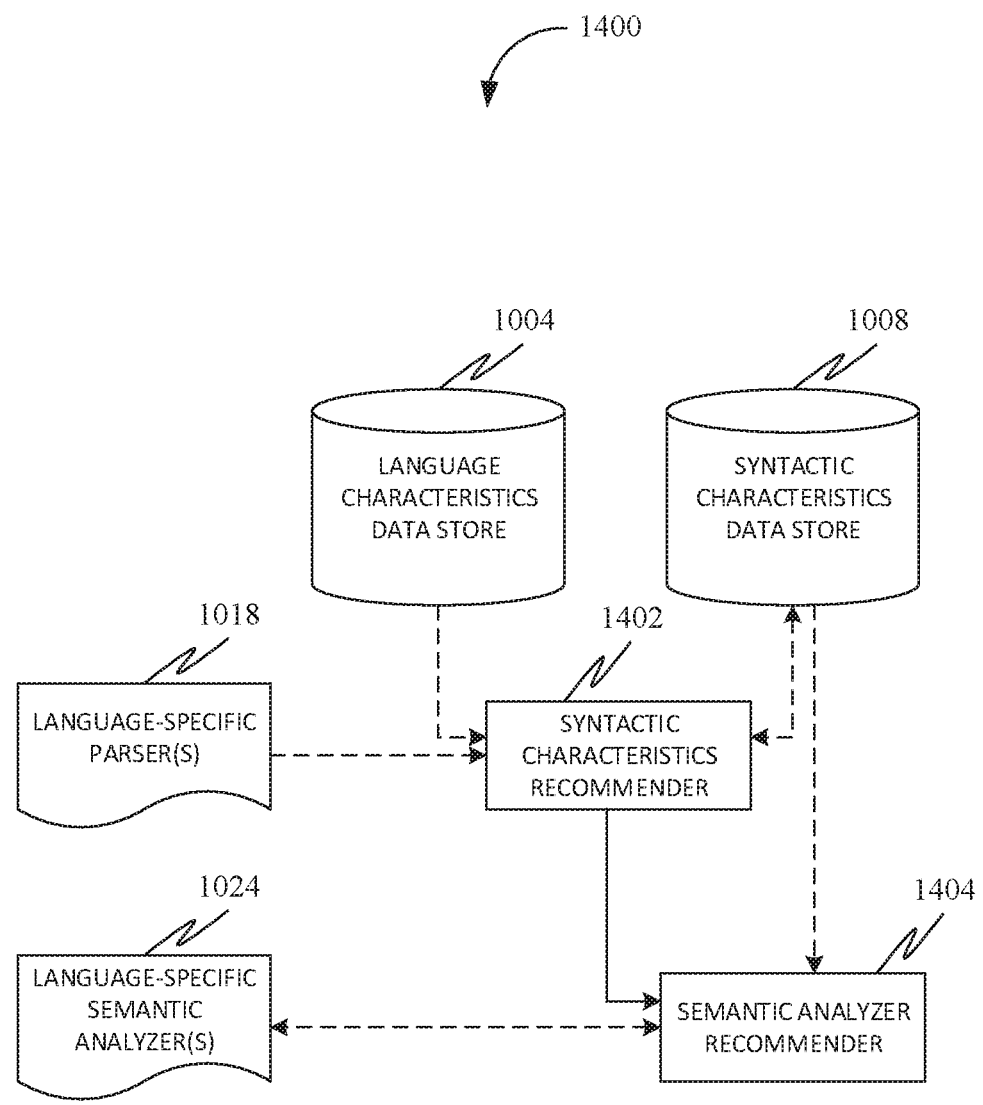
FIG. 14 is an exemplary representation of a recommendation system for syntactic characteristics support, in accordance with some embodiments.

Further, the system may provide a novel modular approach permitting fast model update, avoiding updates spanning the global model for an entire heterogeneous system Further, the system may provide a novel approach for determining interconnections between modules written in different languages Further, the system may provide a novel approach for specifying key language characteristics (both syntactic and semantic), with semi-automated support (recommendation systems) for creating the specifications of those characteristics for new languages, dialects, and communication technologies Further, the system may provide a novel combination of modular approach and inter-modular connections support change impact analysis in heterogeneous software systems There may be five major, interacting phases to the invention, characterized by FIG. 10 (may be referred to as phase 1), FIG. 11 (may be referred to as phase 2), FIG. 12 (may be referred to as phase 3), FIG. 13 (may be referred to as phase 4), and FIG. 14 (may be referred to as phase 5).

Programming languages may come in different versions, often called dialects. For simplicity, the simpler term "language" is generally used below but should be interpreted as "programming language and dialects of programming languages".

Where the term "data store" may be used, this could be an in-memory representation or on-disk representation; it could be a flat-file representation like NoSQL, or a relational database, or a graph database. And the multiple "data stores" could all be combined within a single data repository.

Software go through constant changes in life-cycle to satisfy new requirements, to adapt to new environments, or to fix bugs. However, when performing change tasks, software developers may be concerned with possible negative consequences of the changes that the software developers may make as any original assumptions or constraints related to the software may be silently violated. Therefore, after the initial (primary) change tasks have been performed, software developers may need to locate inconsistencies and make further (secondary) changes accordingly. This process, known as change propagation, is challenging and labor-intensive as it is not always clear where inconsistencies may occur, so every relevant piece of code must be inspected carefully.

Change impact analysis (CIA) may be defined as "the activity of identifying what to modify to accomplish a change, and/or of identifying the potential consequences of a change". The input to CIA may be a set of initially modified software entities, called as starting impact set (SIS), and the output may be a set of entities estimated to be affected, called as estimated impact set (EIS). In principle, a set of entities that may be actually affected by the change called as actual impact set (AIS) may exist. Change propagation (a.k.a., the ripple effect) is a process closely related to CIA, in which a concrete change is made to a software system, forcing subsequent adjustments to be made in order to bring the software to a functioning state, ideally correctly so. Change propagation differs from CIA in that the former must deal with one specific change, while the latter deals with a range of possible changes.

CIA may require more than a simple calculation of the transitive closure of dependencies that may emanate from an initially impacted node (representing a specific point in the software). CIA may also require consideration of an extent of planned changes or low-level decisions about the concrete changes to propagate or not. Planned changes and low-level decisions may be rapidly modified. Therefore, an analysis that may not demand global re-construction of a system dependency graph would better permit rapid feedback to software developers who may be making decisions about the planned changes. CIA may also need to be to be incrementally maintainable, so that changes to one or more underlying dependencies (which may happen frequently during active development) may be accommodated more efficiently so that one or more planned changes or decisions may be flagged as potentially impacted.

Accordingly, the present disclosure provides a data structure (called as modular PDGs, or mPDGs) and one or more algorithms for building modular dependency graphs for a single language, for e.g. Java. The data structure and algorithms may also translate to other languages, such as Python, C++, and so on. The PDGs are called "modularized" in that the PDGs may capture intra-procedural data and control-dependencies only. Side effects may be computed by forward slicing, in which intra-procedural impacts may be acquired by visiting a local mPDG, while inter-procedural impacts may be calculated on-demand by a context-insensitive algorithm aided by the call graph. The data structure may be similar to traditional system dependence graphs (SDGs) but may eliminate elements, such as summary edges, that may prevent SDGs from being truly modular and may give rise to high model building costs. Further, the one or more algorithms may be designed to perform fast slicing over the data structure as an initial estimate of a change impact. As mPDGs may eliminate information that may permit slices of SDGs to be context sensitive, slices made over mPDGs may be context insensitive and non-conservative. Practically, the analysis may miss some special cases and may tend to result in overly large estimated impact sets. mPDGs may be scalable, and may be maintainable as only locally available variables may be used during model construction. Programmers may be interested in a part of a program even in programming languages, such as Java, which may not possess out or in-out parameters. However, any call to an object with a type outside a scope may change the state of the object as a whole, which may be handled as if the reference may have been changed. In order to trace such changes in callees, references to objects with any out-of-scope type may be instantiated as in-out parameters at call-sites.

Figure 8:
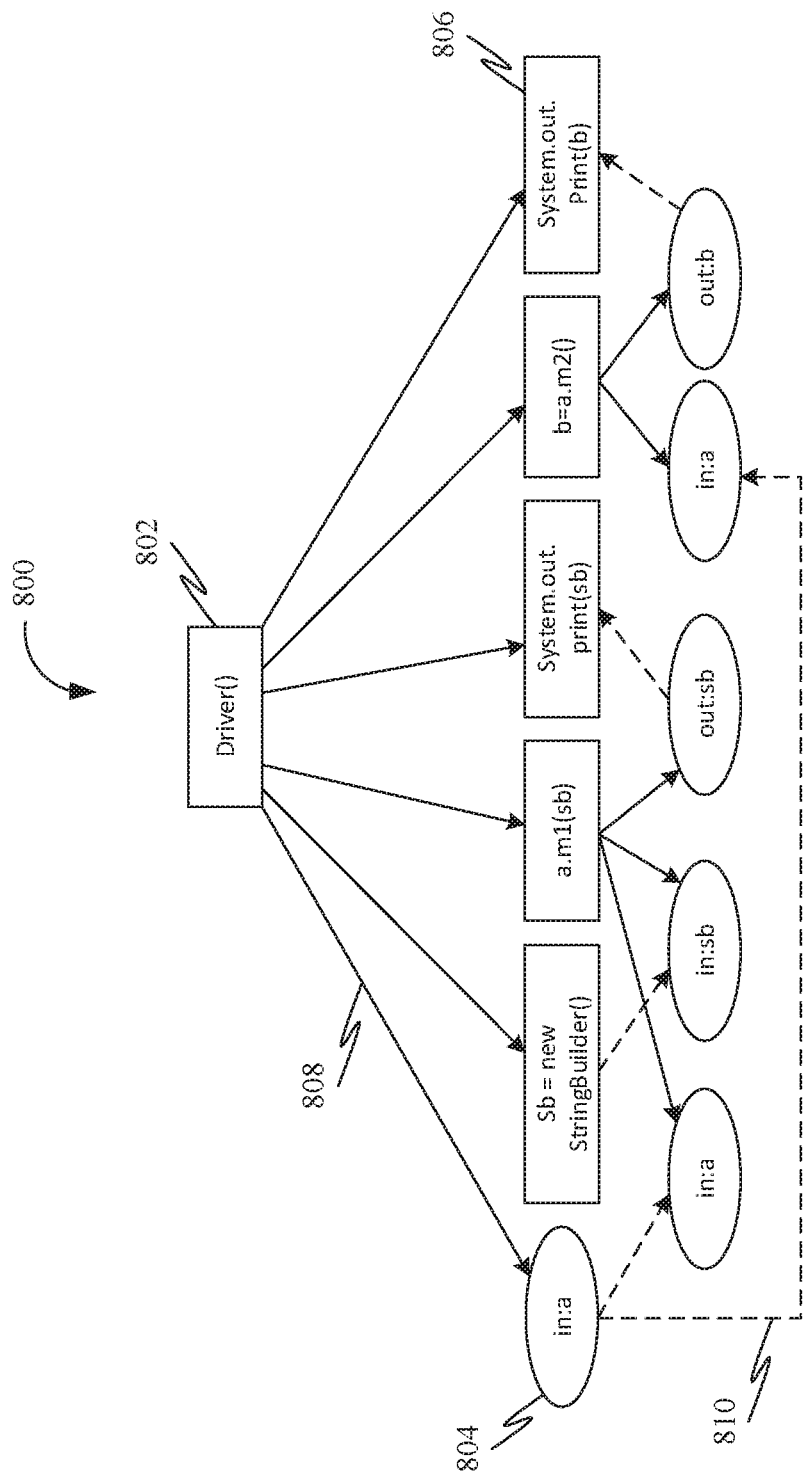
FIG. 8 is an exemplary representation of an mPDG associated with a source code, in accordance with some embodiments.
Figure 9:
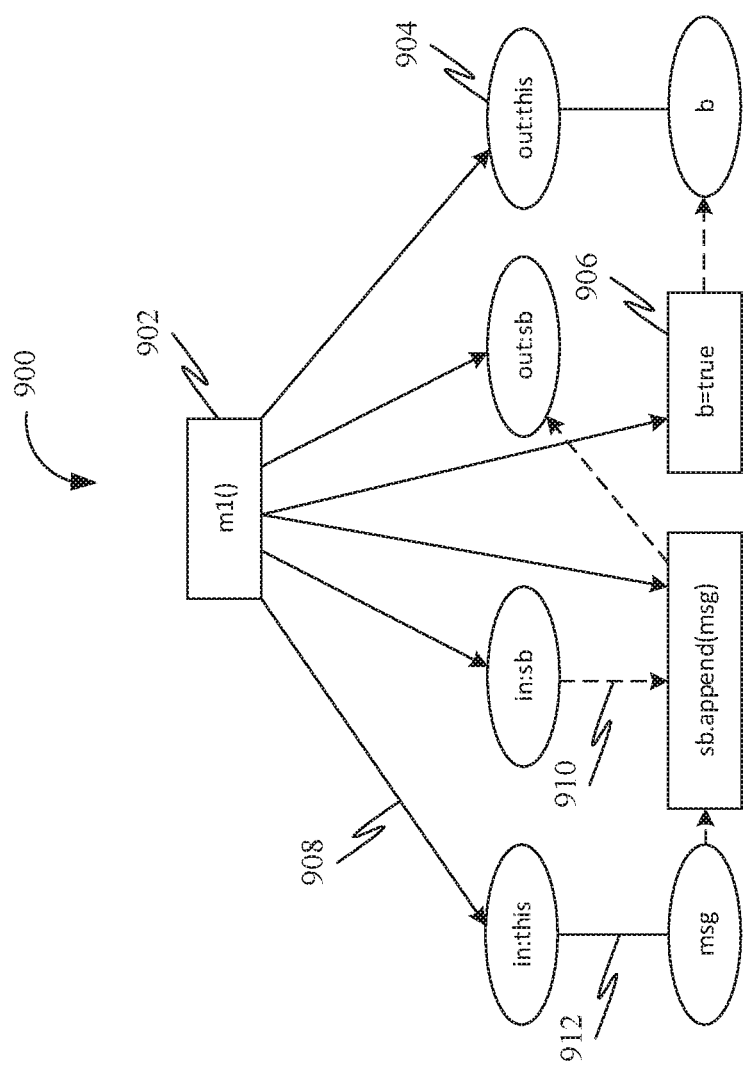
FIG. 9 is an exemplary representation of an mPDG associated with a source code, in accordance with some embodiments.

FIG. 8 is an exemplary representation of an mPDG 800 associated with a source code as disclosed in Appendix—D below. Further, FIG. 9 is an exemplary representation of an mPDG 900 associated with a source code as disclosed in Appendix—D below. In mPDGs (such as mPDG 800 and the mPDG 900), rectangles on top (such as node 802 and node 902 as shown in FIG. 8 and FIG. 9 respectively) may represent entry vertices of procedures, labeled with the method name; other rectangles (such as second child node 806 and second child node 906 as shown in FIG. 8 and FIG. 9 respectively) may represent statements. Ovals (such as first child node 804 and first child node 904 as shown in FIG. 8 and FIG. 9 respectively) may represent parameters, in which variable names may be labeled with "in" and "out", representing in-(input) and out-(output) parameters respectively. Solid arrows (such as solid arrow 808 and solid arrow 908 as shown in FIG. 8 and FIG. 9 respectively) may represent control dependencies; dashed arrows (such as dashed arrow 810 and dashed arrow 910 as shown in FIG. 8 and FIG. 9 respectively) may represent data dependencies. Further, Lines (such as a line 912 as shown in FIG. 9) between "this" and variables may represent that the variables are instance fields. Even though the instance field this.msg may have been treated as an additional parameter of m1( ), this.msg does not propagate back to the call site in driver( ), at which only the call target a and actual parameter sb may be modelled. Further, the actual parameter sb may have an out-of-scope type and hence may be modelled as both an in- and out-parameter. Because only local knowledge may be used, mPDGs may be constructed with intra-procedural data flow analysis. Further, as the call graph uses local knowledge too, updating the model is straightforward. For call graph, update may be performed with a knowledge of atomic change types and changes in dynamic dispatch. For mPDGs, those of deleted methods may be removed, those of newly added methods may be built, and those of updated methods may be deleted and then reconstructed with new code. Further, given a changed statement, the intra-procedural impacted set of the changed statement may be easily located by visiting mPDGs. However, finding an inter-procedural impacted set may be complicated. Because side effects may be propagated only through either output parameters or object states, the task of finding the inter-procedural impacted set may be divided into two sub-problems: finding impacted elements caused by method call/return and by fields. To find impacted elements caused by method call/return, impacted input and output of methods may be traced by following call chains. To find impacted elements caused by fields, all occurrences of impacted fields may be looked up among mPDGs to find where the impacted fields may be used as formal inputs and continue slicing.

Further, an algorithm that depicts the procedure of slicing is disclosed in Appendix—A below. A data structure called as criterion is introduced, consisting of four attributes: a seed node, a distance, a set of impacted outputs, and a set of impacted fields. The distance attribute specifies how far away a criterion may be from the original criterion, for which the distance is 0 (line 2); every time the slicer needs to go into a method, a new criterion may be generated and the distance of the new criterion may be represented as the distance of the current criterion under consideration plus 1. The algorithm uses a queue to manage all criteria. When a criterion is de-queued, the algorithm calls sliceDown to slice the method that contains the seed. After slicing has been done, the algorithm maps impacted formal to actual-out parameters at each call-site, generates new criteria, and includes the generated criteria into queues.

Further, an algorithm that illustrates the recursive procedure of sliceDown is disclosed in Appendix—B below. The algorithm first checks a distance attribute of a criterion: if the value of the distance attribute found is larger than dist, then no slicing may be performed. This means that methods, that are out of the range, and are processed as if the methods are impacted. Further, the algorithm may check whether the criterion seed has been sliced. If the criterion seed has been sliced, one or more cached impacted outputs may be copied, so that the slicer may be able to reuse previous results. If above two checks fail, slicing may be performed by visiting mPDG with a queue. Starting from the seed, different actions may be taken according to the node type. For call site nodes, entry nodes of callees may be used as seeds to produce new criteria and sliceDown may be called. Further, based on the slicing results, impacted actual-out nodes may be put into the queue. Actual-in nodes may be handled in a similar way as call-site nodes, except that the seeds correspond to formal-in nodes rather than entry nodes. Formal-out nodes, in case of nonlocal variables, may be put into either a set of impacted output or fields. For local variables, aliases of the formal-out nodes may be found by calling findAlias, then the formal-out nodes may be put into corresponding set. Outgoing neighbors of all other nodes are put into the queue. Finally, an intra-procedural slice may be added to global slide. The impacted output set may be cached. For each impacted field, reference may be looked up and the found nodes may be used to create new criteria, which may be added into the criteria queue. The algorithm may be context-insensitive in that, whenever a field of an object is impacted, the algorithm assumes that methods of all objects from a same class, that refer to the field, may be impacted. Thus, calling context may be ignored.

Further, an algorithm that illustrates the recursive procedure findAlias is disclosed in Appendix—C below. The algorithm attempts to determine which fields or formal parameters may be aliases of a given local variable. The purpose of the algorithm is to ensure that changes made to the variables are visible outside methods. The procedure findAlias calls itself recursively by traversing established data dependencies within mPDGs backwards. Further, a type of a given variable may be checked. If the variable is determined to be primitive, an empty set may be returned. Further, the predecessors may be retrieved, and different actions may be taken according to types of the predecessors. For [base case], the predecessor may be a formal-in parameter and the predecessor may be added to the result. If the predecessor is a simple statement and LHS variable of the predecessor equals the given variable, the aliases of its RHS variable may be computed in a similar method. If the predecessor is a call statement and the LHS variable of the predecessor equals the given variable, the process may involve two steps: aliases of formal return may be computed in callees, and for each formal-in parameter in returned set, aliases of the corresponding actual-in parameter may be computed through the original method. If the predecessor is an actual-out parameter, aliases of formal-out may be computed in callees, and for each formal-in parameter in returned set, aliases of the corresponding actual-in parameter may be computed through the original method.

The effect on speed and size of mPDG building and slicing algorithms may be evaluated on sample open-source systems of varying sizes. Further, Java-based equivalents of non-modular PDGs and context-sensitive SDGs (equivalent to existing industrial tools, CodeSurfer and Wala) may be built to determine differences between non-modular PDGs, context-sensitive SDGs, and mPDG-based slicing. Further, any shortcomings of mPDG-based slicing may be determined to detect presence of one or more problem conditions, which may be observed by one or more users and may be handled manually. Further, one or more algorithms to incrementally update mPDGs in the face of modifications to the underlying codebase may be designed and implemented. Further, required mPDG changes may be limited to within individual modules.

Additionally, a retrospective analysis of a change history of sample open-source systems may be performed to measure effects of real, historic changes to those systems on the mPDGs. For instance, consider a sequence of versions for a system from version v1, v2, up to vn. For such a system, the difference between two adjacent versions j−1 and j may be Δvj. Accordingly, an mPDG monolithically built for vn should be identical to building an mPDG for v1 and updating it repeatedly up to vn. This property may be tested for a small subset of sample systems and identified errors may be corrected. Then, time and space costs for incrementally maintaining mPDGs across the sample systems may be calculated. Further, relationships between the size and extent of changes may be considered to check for possible categorizations that could be better leveraged to speed up maintenance. For example, it may be possible that a standard refactoring would cause large changes to occur with a correspondingly high cost, but such a standard refactoring might be more directly supported by a modified update algorithm, rather than reacting to the widespread changes resulting from the refactoring.

A recommender approach may be taken for ranking impacted entities. Heuristics may be based on historical evidence as accumulated from a standard version control system regarding co-change probability or based on a spectrum of known kinds of changes.

The retrospective analysis of a change history of sample open-source systems may be performed to measure effects of real, historic changes to those systems on the mPDGs. Accordingly, it may be determined whether heuristics may lead a software developer to quickly find the actual impact set more quickly, by ranking potential impacts according to the heuristics, and deciding on the potential impacts (as done by one or more original software developers according to the recorded change history) in the order in which the potential impacts may be ranked. Many unlikely dependencies may be filtered when the dependencies may be present due solely to transitive dependence from an entity that may have been explicitly decided upon as not actually impacted, leading to a massive reduction in the number of nodes that may require manual inspection. Further, threshold values for the heuristics, below which an automated "ignore" decision may be possible, may be determined. Further, human software developers may be engaged to judge whether CIA recommendation system may be effectively utilized.

Modular dependency analysis, i.e., a dependency analysis that may be subdivided into smaller pieces and built back up into an analysis for a complete system, may be performed, which may allow module analyses to be specialized to particular languages and technologies, permitting support for new ones to be added more easily.

Sample open-source heterogeneous systems may be examined to identify means by which one or more disparate parts of the heterogeneous systems may communicate. As an example, Java modules may communicate with C/C++ modules via Java Native Interface, which defines a mapping between names that are meaningful within each of the two contexts. In such a case, mapping may require a straightforward transformation of method names but a more complex transformation of names representing types. Based on results of the conducted examinations a standard model may be defined to represent declared entities that may be referenced by external entities and for representing referenced entities that may be expected to be declared externally.

Further, from a set of sample languages and technologies, model generators may be implemented to conform to the standard model of as proofs-of-concept. Embedded languages, e.g., SQL commands embedded within string literals within C# may be supported, natural language support may be provided to allow imperfect references to entities in documents to be linked to entities, and embedded comments may be connected to other entities.

Further, modular model generators may be determined whether the modular generators may cover all the sample systems found. Time and space requirements may be determined to consider growth characteristics and determine where proof-of-concept implementations would not suffice in a real-world setting.

Further, mechanisms by which inputs and outputs of different modules can be interconnected may be determined to minimize repetitive work, while providing for a maintainable system that may not require massive implementation effort to extend support to new languages or technologies. In an embodiment, a mechanism to manually specify transformations to connect inputs to outputs defined based on a triplet of specific languages in the two modules, and the technology mediating the interconnection may be used. In some embodiments, an adaptive recommendation system that may suggest specific, concrete connections in specific cases based on heuristics (such as simple name similarity), may be implemented. The transformation specification for the triplet (language, language, technology) may be inferred based on the connections made within concrete examples as decided by a software developer. The technique may also take into account that technology versions and language dialects may develop over time, so apparent inconsistencies in developer decisions may indicate that the transformation specification triplet may need to be split. Further, software developers may be engaged to judge the recommendation system.

Further, it may be determined whether the modular dependency model is sufficient to represent dependencies in sample systems. Factors such as complexity, and whether small variations in language dialects/technology versions may be accommodated by commensurate edits to an existing transformation specification, may be considered. Retrospective analysis of version control history of the sample systems may be used to determine how an initial configuration, demonstrably sufficient for an early version of a sample system, may need to be modified or otherwise extended over time.

Further, heterogeneous dependency graphs may be encoded in the system. A set of standard use cases (e.g., initial build; update as information is added, deleted, or changed; retrieval of query results), and constraints on data structures to be supported may be determined. Further, artificial datasets may be constructed to simulate cases where the modules may be tightly-coupled, loosely-coupled, or somewhere in between; where individual modules may be smaller or larger; where the number of modules may be small or large. Further, the artificial datasets may be implemented using one or more target database technologies.

Further, change impact analysis may be supported in enterprise-scale heterogeneous systems. To transfer overall results to an industry, results may also need to be integrated with one or more existing, industrial toolset.

Further mPDGs may be combined with the modular dependency analysis work to generate heterogeneous modular dependency models. Further, CIA may be performable on the heterogeneous modular dependency models, and incremental update algorithms and recommenders may also be applicable to the heterogeneous modular dependency model. Further, the heterogeneous modular dependency models may be evaluated to determine whether the heterogeneous modular dependency models may have violated any previously made assumptions on CIA. Further, a set of standard use cases (e.g., initial build; update as information is added, deleted, or changed; retrieval of query results), and constraints on heterogeneous modular dependency models may be determined. Further, artificial datasets may be constructed to simulate cases where the heterogeneous modules may be tightly-coupled, loosely-coupled, or somewhere in between; where individual modules may be smaller or larger; where the number of modules may be small or large. Further, the artificial datasets may be implemented using one or more target database technologies. Further, the performance of the heterogeneous modular dependency models may be evaluated.

FIG. 1 is an illustration of an online platform 100 consistent with various embodiments of the present disclosure. By way of non-limiting example, the online platform 100 to facilitate change impact analysis (CIA) using modular program dependency graphs may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, and over a communication network 114, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform.

A user 116, such as the one or more relevant parties, may access online platform 100 through a web based software application or browser. The web based software application may be embodied as, for example, but not be limited to, a website, a web application, a desktop application, and a mobile application compatible with a computing device 1700.

According to some embodiments, the online platform 100 may be configured to facilitate fast and maintainable change impact analysis through the generation of modularized program dependency graphs.

The online platform 100 may communicate with one or more user devices. The one or more user devices may include one or more mobile devices such as, but not limited to, smartphones, computer tablets, laptops, and so on. The one or more user devices may include a communication device configured to communicate over a communication network such as, but not limited to, a cellular network, a satellite network, a personal area network, Bluetooth, Internet and so on.

Further, the online platform 100 may receive, using a communication device, source code for a software application from one or more connected user devices. The source code may pertain to a software application, which may include one or more functionalities, and features, which may be divided into modules, where each module may describe a procedure to provide a particular feature. The software may be homogeneous, i.e. the software may be written in one programming language. In some embodiments, the software may be heterogeneous, and may be written in multiple languages.

Further, the online platform 100 may analyze the received source code to generate one or more mPDGs. The source code of the software may be analyzed to determine one or more different modules, all of which may correspond to one or more procedures that may be performed by the software application to provide one or more features. Accordingly, upon determination of the one or more modules, one or more data dependencies and control dependencies in each of the one or more modules may be determined, and mPDGs, or modular program dependence graphs may be generated for the one or more modules in the source code of the software application. An mPDG may be a representation, using graph notation that may make data dependencies and control dependencies in the one or more modules of the source code explicit. Further, in some embodiments, the mPDGs may eliminate elements, such as summary edges, to make the mPDGs truly modular.

Further, the online platform 100 may incrementally update the generated mPDGs to reflect one or more changes made in the source code. Further, the incremental updates to the mPDGs may be made through one or more algorithms. The incremental updates made to the one or more mPDGs may represent changes in one or more data dependencies and control dependencies in the one or more modules of the source code. Further, in some embodiments, the online platform 100 may transmit the updated mPDGs to the user device. Accordingly, the online platform 100 may facilitate performance of change impact analysis of the source code based on the one or more changes made in the source code.

Figure 2:
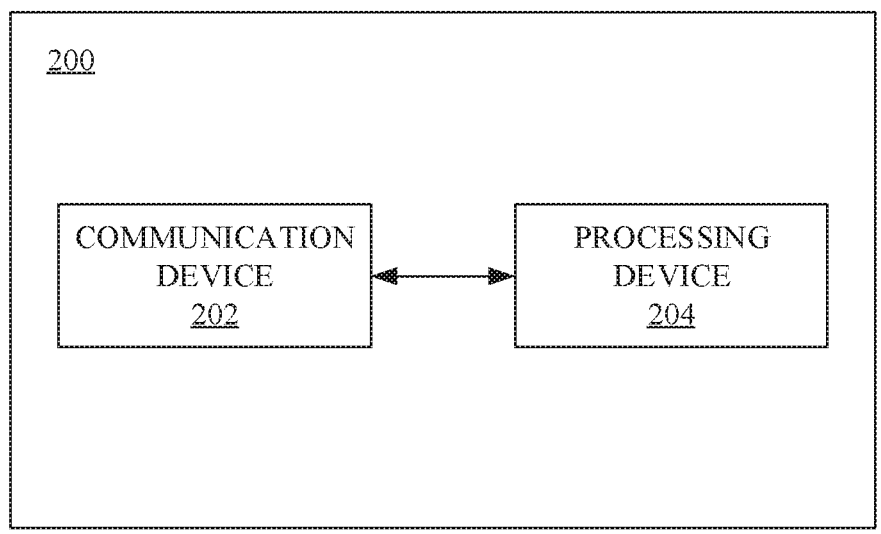
FIG. 2 is a block diagram representation of a system for facilitating Change Impact Analysis (CIA) using modular program dependency graphs, in accordance with some embodiments.

FIG. 2 is a block diagram representation of a system 200 for facilitating Change Impact Analysis (CIA) using modular program dependency graphs, in accordance with some embodiments. Further, the system 200 may include a communication device 202 configured for receiving a source code for a software application and one or more changed lines corresponding to the source code from a user device on demand and/or from a scheduled task using a scanning crawler process to build the mPDGs model. Further, in some embodiments, the source code may be written in one or more programming languages. Further, the one or more programming languages, in an instance, may include (but not limited to) C, C++, Java, and Python.

Further, the communication device 202 may be configured for transmitting one or more impacted lines from the source code associated with the software application to the user device. Further, the transmitting of any and all potentially impacted or referenced source code line(s) from the original software application to the user device may be based on search results retrieved from the mPDG model for each search expression processed.

Further, the system 200 may include a processing device 204 configured for analyzing the source code to determine one or more modules associated with the source code. Further, the module, in an instance, may be representing a portion of a program separated syntactically from the rest with a well-defined communication interface. For instance, the module may include syntactic elements specific to a programming language that possess a well-defined calling interface, e.g. function, procedure, method, subroutine etc. Further, in some embodiments, the module of the one or more modules may be a set of one or more program statements associated with the source code. Further, each program statement of the one or more program statements may be at least one of a data dependency statement and a control dependency statement. Further, each module, in an instance, may describe one or more procedures to provide one or more features.

Further, the processing device 204 may be configured for generating one or more modular Program Dependency Graphs (mPDGs) based on the analyzing. Further, an mPDG in the one or more mPDGs corresponds to a module of the one or more modules. Further, in some embodiments, the mPDG of the one or more mPDGs may be a representation of the module, internal to the memory of the processing device 204, and may be communicated via the communication device 202 to the user device where the mPDG may be transformed into a visual representation. Further, the representation may include a directed acyclic graph structure including a root node and one or more child nodes. Further, the root node may be associated with a name of the module. Further, the root node may be connected to the one or more child nodes through one or more branches. Further, each child node of the one or more child nodes may be connected to the root node. Further, each child node of the one or more child nodes may be connected to any of the one or more child nodes. Further, each child node of the one or more child nodes may be associated with at least one program statement of the module.

Further, the processing device 204 may be configured for updating at least one mPDG in the one or more mPDGs based on the one or more changed lines to obtain the at least one updated mPDG. Further, in some embodiments, the update may be an incremental update, for instance, in a specific order (for e.g. one by one). Further, in some embodiments, the processing device 204 may be configured for updating at least one mPDG in mPDGs persistent data store model, based on the one or more changed software application source code lines received from time to time that may be initiated on demand using a communication device or scheduled using a scanning crawler process to refresh the mPDGs model.

Further, the processing device 204 may be configured for searching the mPDG based on search expressions associated with the one or more changed lines. Further, the searching of the mPDG model may be based on search expressions received from a communication device with one or more proposed software application source code changes.

Further, the processing device 204 may be configured for calculating the one or more impacted lines of the source code based on the searching. Further, the processing device 204, in an instance, may calculate any and all impacted line(s) of the source code based on the one or more mPDGs impacted by each search criteria received In some embodiments, the communication device 202 may be further configured for transmitting an updated comprehensive PDG to the user device. Further, the processing device 204 may be configured for combining the one or more mPDGs. Further, the processing device 204 may be configured for generating a comprehensive Program Dependency Graph (PDG) based on the combining. Further, the processing device 204 may be configured for updating the comprehensive PDG based on the one or more changed lines to obtain the updated comprehensive PDG.

In some embodiments, the processing device 204 may be further configured for determining one or more programming languages associated with the source code by using a language characteristics data retrieved from a language characteristics data store. Further, in some embodiments, the language characteristics data store may be configured to store at least one of an identifier of the programming language, an identifier of a dialect, a specification of standard file extension, and a specification of enclaves. Further, the processing device 204 may be configured for parsing the source code based on the determining of the one or more programming languages to identify the one or more modules associated with the source code. Further, the processing device 204 may be configured for identifying one or more syntactic elements within each module of the one or more modules based on at least one of a syntactic characteristics data retrieved from a syntactic characteristics data store, and a language-specific semantic data retrieved from a semantic data store. Further, in some embodiments, the syntactic characteristics data store may be configured to store at least one of an identifier of a parser, one or more syntactic elements corresponding to references, and one or more syntactic elements supported by the parser corresponding to declaration.

Further, in some embodiments, the processing device 204 may be configured for producing the one or more mPDGs corresponding to the one or more modules based on the identifying of the one or more syntactic elements within each module of the one or more modules. Further, a storage device may be configured for storing the one or more mPDGs in a persistent modular dependency graph data store. Further, in some embodiments, the persistent modular dependency graph data store may be configured to store an identifier of the module, an identifier of a file associated with the source code, an identifier of language and dialect, and the one or more mPDGs.

Figure 3:
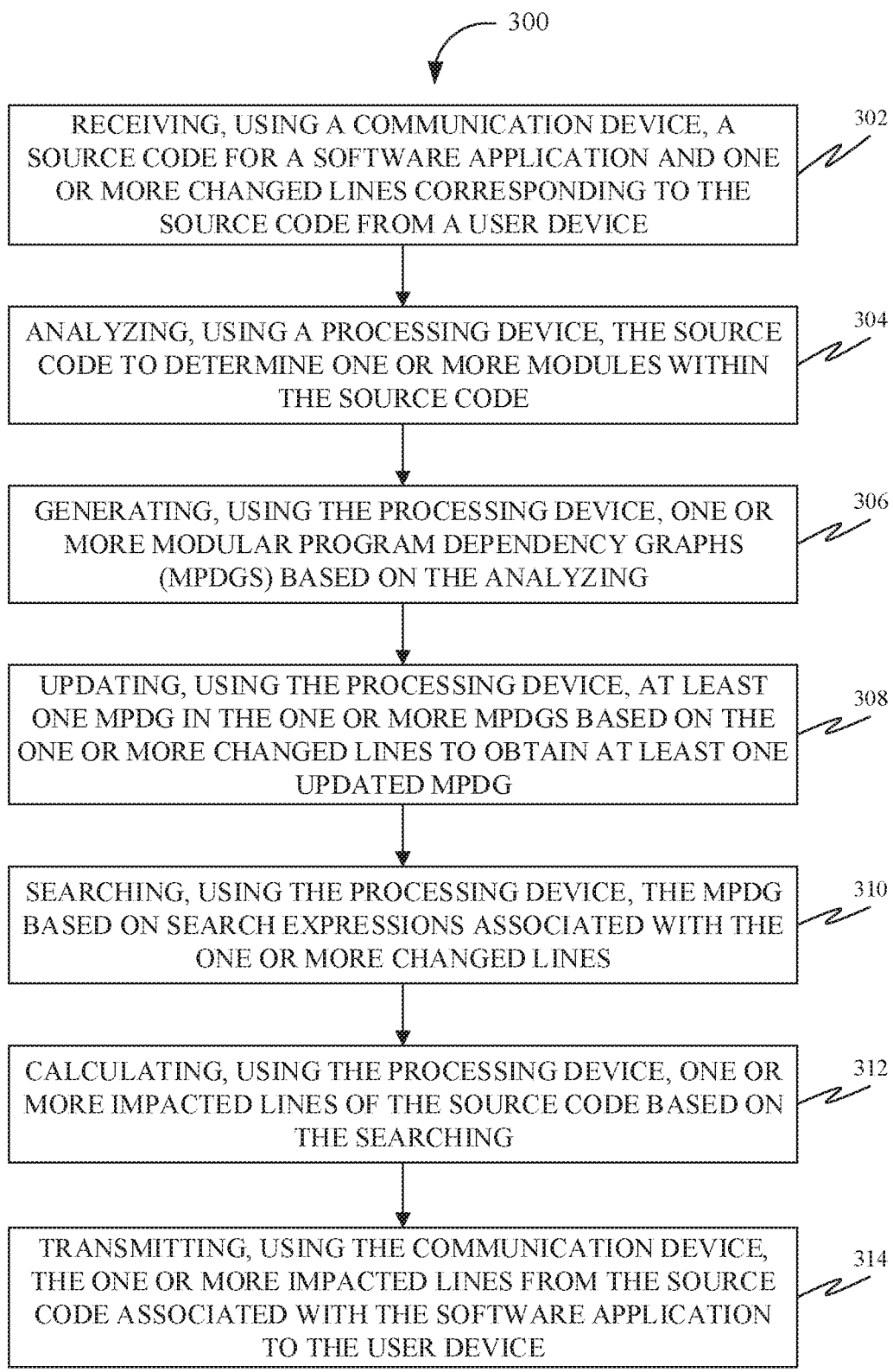
FIG. 3 is a flowchart of a method for facilitating Change Impact Analysis (CIA) using modular program dependency graphs, in accordance with some embodiments.

FIG. 3 is a flowchart of a method 300 for facilitating Change Impact Analysis (CIA) using modular program dependency graphs, in accordance with some embodiments. Accordingly, at 302, the method 300 may include receiving, using a communication device (such as the communication device 202), a source code for a software application and one or more changed lines corresponding to the source code from a user device on demand and/or from a scheduled task using a scanning crawler process to build the mPDGs model. Further, in some embodiments, the source code may be written in one or more programming languages;

Further, at 304, the method 300 may include analyzing, using a processing device (such as the processing device 204), the source code to determine one or more modules associated with the source code. Further, in some embodiments, the module of the one or more modules may be a set of one or more program statements associated with the source code. Further, each program statement of the one or more program statements may be at least one of a data dependency statement and a control dependency statement.

Further, at 306, the method 300 may include generating, using the processing device, one or more modular Program Dependency Graphs (mPDGs) based on the analyzing. Further, an mPDG in the one or more mPDGs may correspond to a module of the one or more modules. Further, in some embodiments, the mPDG of the one or more mPDGs may be a representation of the module. Further, the representation may include a directed acyclic graph structure comprising a root node and one or more child nodes. Further, the root node may be associated with a name of the module. Further, the root node may be connected to the one or more child nodes through one or more branches. Further, each child node of the one or more child nodes may be connected to the root node through one or more branches. Further, each child node of the one or more child nodes may be connected to any of the one or more child nodes through one or more branches. Further, each child node of the one or more child nodes may be associated with at least one program statement of the module.

Further, at 308, the method 300 may include updating, using the processing device, at least one mPDG in the one or more mPDGs based on the one or more changed lines to obtain at least one updated mPDG. Further, in some embodiments, the processing device may be configured for updating at least one mPDG in mPDGs persistent data store model, based on the one or more changed software application source code lines received from time to time that may be initiated on demand using a communication device or scheduled using a scanning crawler process to refresh the mPDGs model.

Further, at 310, the method 300 may include searching, using the processing device, the mPDG based on search expressions associated with the one or more changed lines. Further, the searching of the mPDG model may be based on search expressions received from a communication device with one or more proposed software application source code changes.

Further, at 312, the method 300 may include calculating, using the processing device, one or more impacted lines of the source code based on the searching. Further, the processing device, in an instance, may calculate any and all impacted line(s) of the source code based on the one or more mPDGs impacted by each search criteria received.

Further, at 314, the method 300 may include transmitting, using the communication device, the one or more impacted lines from the source code associated with the software application to the user device. Further, the transmitting of any and all potentially impacted or referenced source code line(s) from the original software application to the user device may be based on search results retrieved from the mPDG model for each search expression processed.

Figure 4:
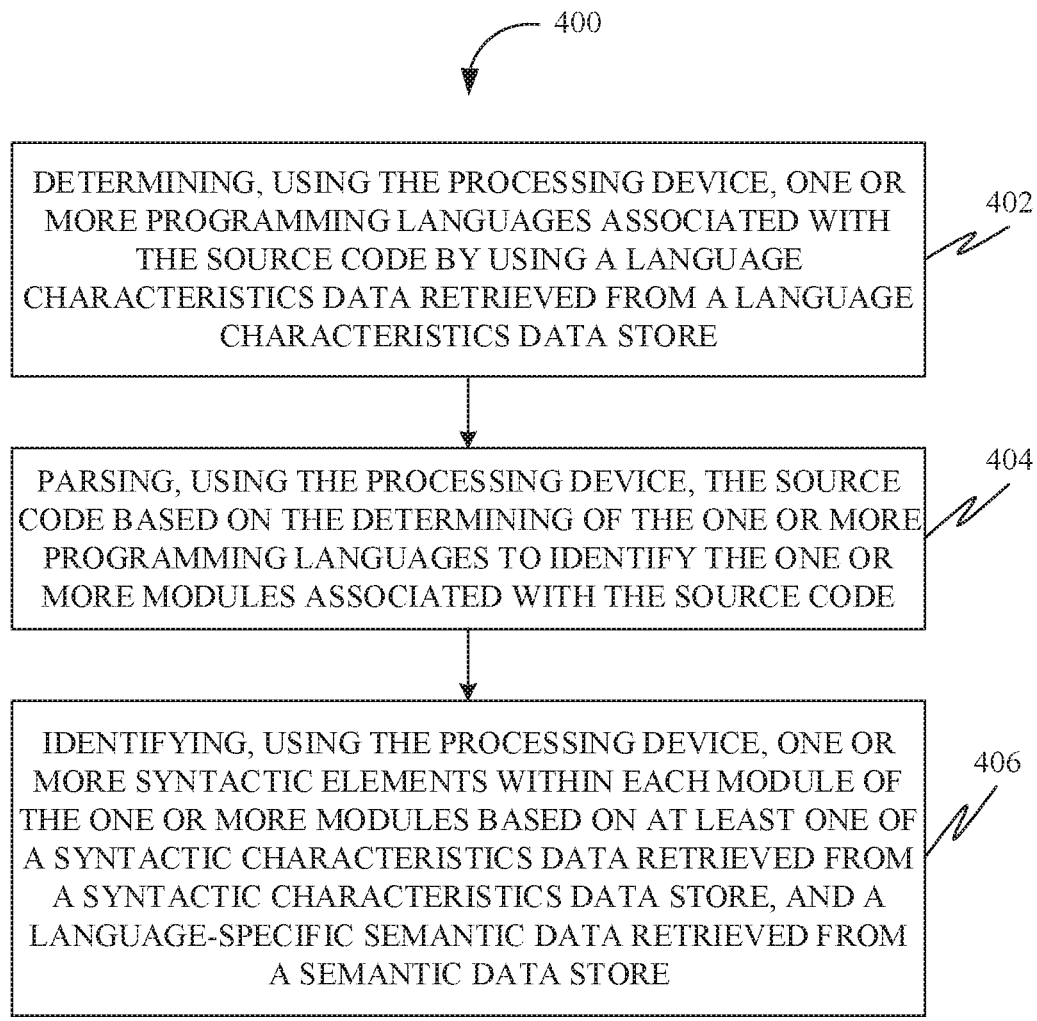
FIG. 4 is a flowchart of a method to facilitate analyzing the source code, in accordance with some embodiments.

FIG. 4 is a flowchart of a method 400 to facilitate analyzing the source code, in accordance with some embodiments. Accordingly, at 402, the method 400 may include determining, using the processing device, one or more programming languages associated with the source code by using a language characteristics data retrieved from a language characteristics data store. Further, in some embodiments, the language characteristics data store may be configured to store at least one of an identifier of a programming language, an identifier of a dialect, a specification of standard file extension, and a specification of enclaves.

Further, at 404, the method 400 may include parsing, using the processing device, the source code based on the determining of the one or more programming languages to identify the one or more modules associated with the source code.

Further, at 406, the method 400 may include identifying, using the processing device, one or more syntactic elements within each module of the one or more modules based on at least one of a syntactic characteristics data retrieved from a syntactic characteristics data store, and a language-specific semantic data retrieved from a semantic data store. Further, in some embodiments, the syntactic characteristics data store is configured to store at least one of an identifier of a parser, one or more syntactic elements corresponding to references, and one or more syntactic elements supported by the parser corresponding to declaration.

Figure 5:
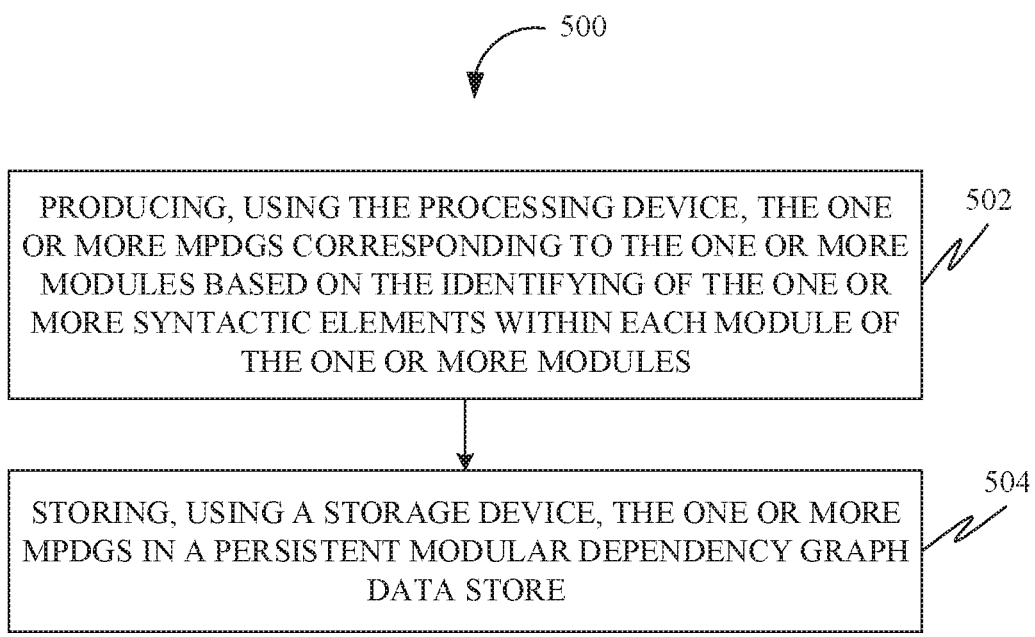
FIG. 5 is a flowchart of a method to facilitate generating the one or more mPDGs, in accordance with some embodiments.

FIG. 5 is a flowchart of a method 500 to facilitate generating the one or more mPDGs, in accordance with some embodiments. Further, at 502, the method 500 may include producing, using the processing device, the one or more mPDGs corresponding to the one or more modules based on the identifying of the one or more syntactic elements within each module of the one or more modules.

Further, at 504, the method 500 may include storing, using a storage device, the one or more mPDGs in a persistent modular dependency graph data store. Further, in some embodiments, the persistent modular dependency graph data store may be configured to store an identifier of the module, an identifier of a file associated with the source code, an identifier of language and dialect, and the one or more mPDGs.

Figure 6:
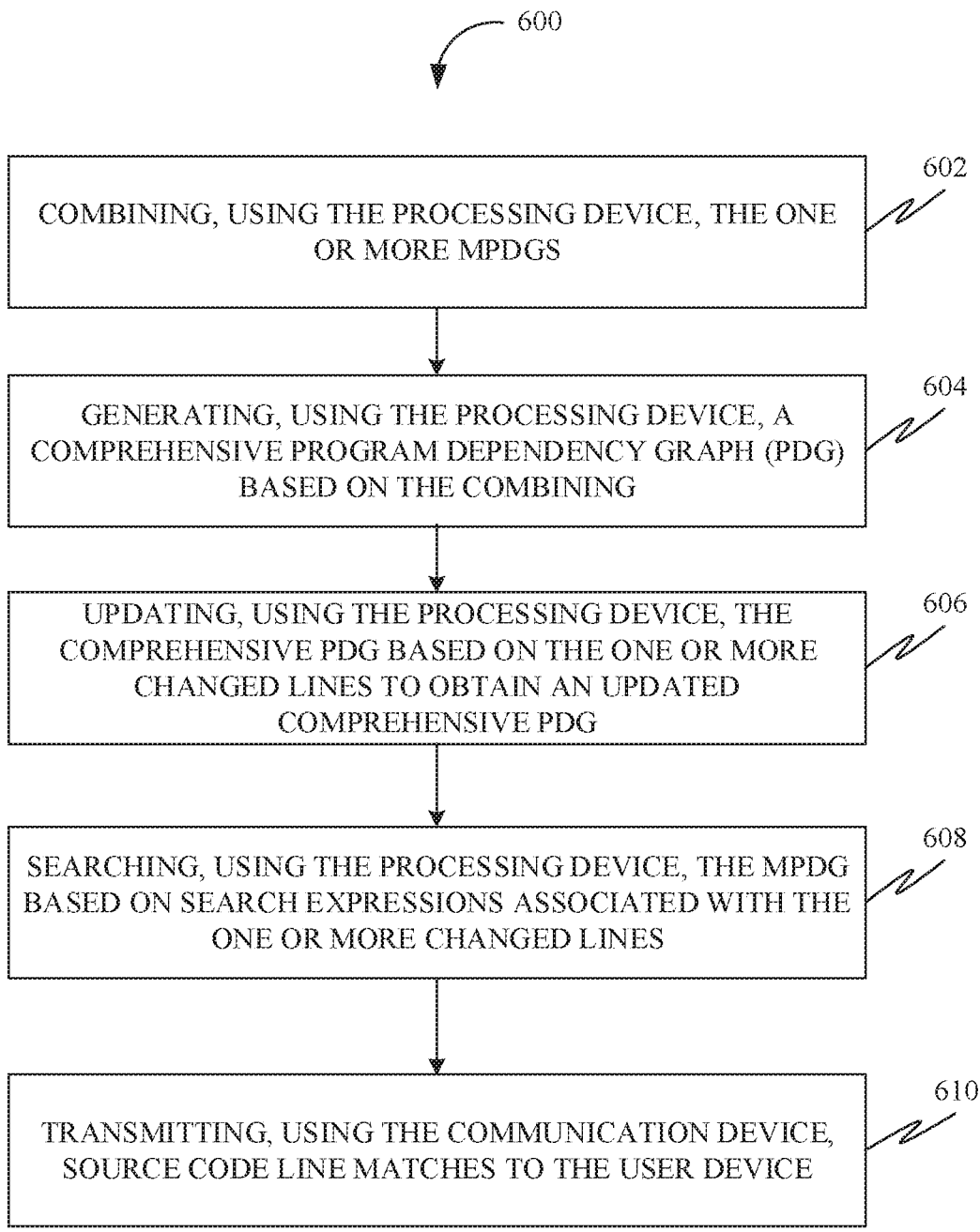
FIG. 6 is a flowchart of a method to facilitate Change Impact Analysis (CIA) using modular program dependency graphs, in accordance with some exemplary embodiments.

FIG. 6 is a flowchart of a method 600 to facilitate Change Impact Analysis (CIA) using modular program dependency graphs, in accordance with some exemplary embodiments. Accordingly, at 602, the method 600 may include combining, using the processing device, the one or more mPDGs.

Further, at 604, the method 600 may include generating, using the processing device, a comprehensive Program Dependency Graph (PDG) based on the combining.

Further, at 606, the method 600 may include updating, using the processing device, the comprehensive PDG based on the one or more changed lines to obtain an updated comprehensive PDG. The one or more changed lines may be obtained from a user device on demand and/or from a scheduled task using a scanning crawler process to build the mPDGs model.

Further, at 608, the method 600 may include searching, using the processing device, the mPDG based on search expressions associated with the one or more changed lines.

Further, at 610, the method 600 may include transmitting, using the communication device, source code line matches to the user device.

Figure 7:
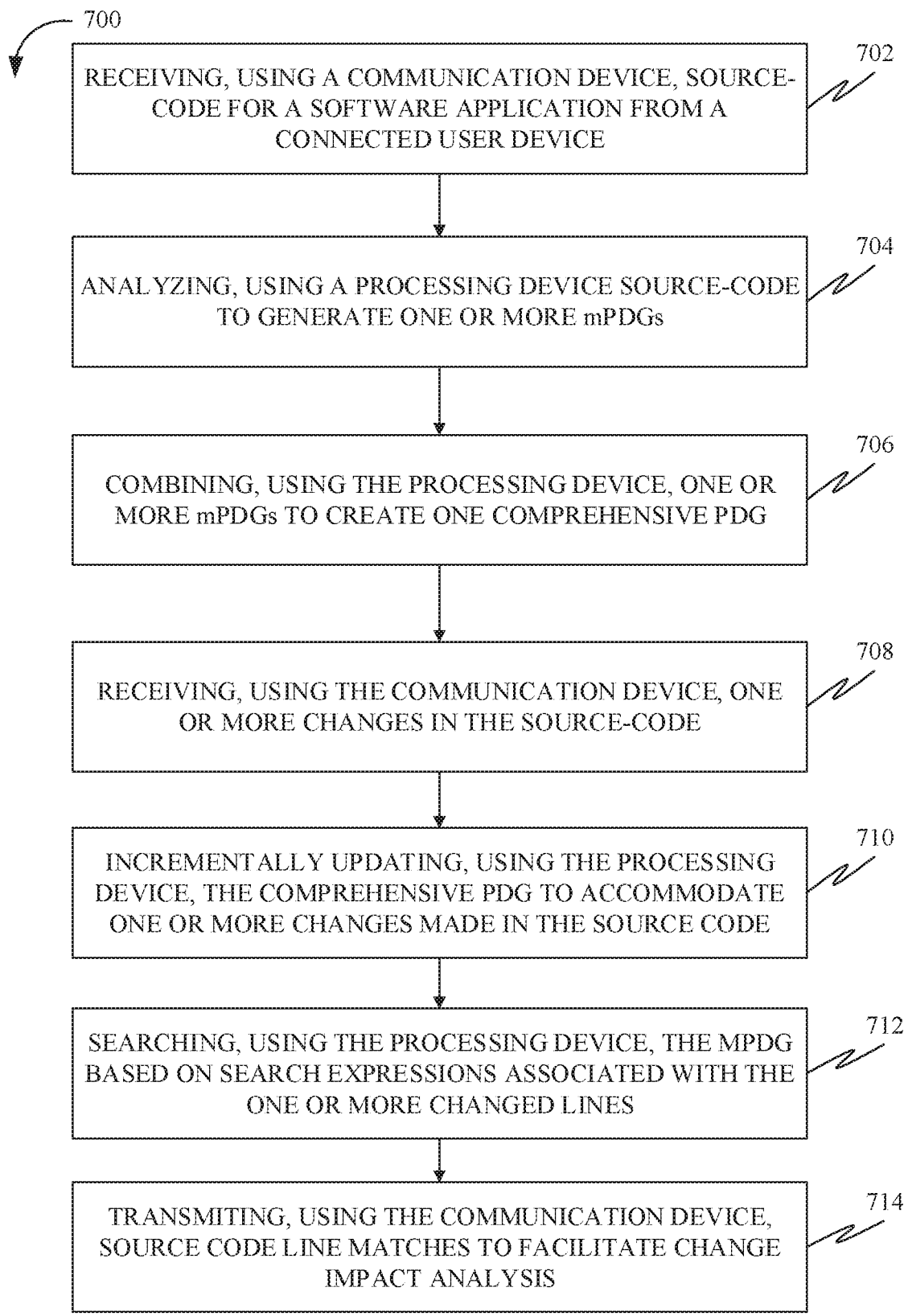
FIG. 7 is a flowchart of a method to facilitate fast and maintainable change impact analysis through the generation of modularized program dependency graphs, in accordance with some embodiments.

FIG. 7 is a flowchart of a method 700 to facilitate fast and maintainable change impact analysis through the generation of modularized program dependency graphs, in accordance with some embodiments. Accordingly, at 702, the method 700 may include a step of receiving, using a communication device, source code for a software application from a connected user device. The source code may pertain to a software application, which may include one or more functionalities, and features, which may be divided into modules, where each module may describe a procedure to provide a particular feature. The software may be homogeneous, i.e. the software may be written in one programming language. In some embodiments, the software may be heterogeneous, and may be written in multiple languages.

Further, at 704, the method 700 may include a step of analyzing, using a processing device, the source code to generate one or more mPDGs. The source code of the software may be analyzed to determine one or more different modules, all of which may correspond to one or more procedures that may be performed by the software application to provide one or more features. Accordingly, upon determination of the one or more modules, one or more data dependencies and control dependencies in each of the one or more modules may be determined, and mPDGs, or modular program dependence graphs may be generated for the one or more modules in the source code of the software application. An mPDG may be a representation, using graph notation that may make data dependencies and control dependencies in the one or more modules of the source code explicit. In some embodiments, the mPDGs may eliminate elements, such as summary edges, to make the mPDGs truly modular.

Further, at 706, the method 700 may include a step of combining, using the processing device, one or more mPDGs to create a comprehensive Program Dependency Graph (PDG). The comprehensive PDG may represent all data dependencies and control dependencies in the one or more modules in the source code of the software application. Further, the comprehensive PDG may represent all data dependencies and control dependencies across the one or more modules of the source code.

Further, at 708, the method 700 may include a step of receiving, using the communication device, one or more changes in the source code from the connected user device on demand and/or from a scheduled task using a scanning crawler process to build the mPDGs model. One or more changes in the source code may represent changes in one or multiple lines of code in the one or more modules of the source code. The one or more changes may be updates, corrections, or deletions to improve, add, correct, or remove one or more procedures, or parts thereof in the one or more modules of the source code. In an instance, the one or more changes in the source code of the software application may be received through an input mechanism of the connected user device. Further, the user device may be configured to communicate with the communication device of a server computer implementing the online platform. Accordingly, in an instance, the one or more changes in the source code of the software application input through the input mechanism may be transmitted from the connected user device to the server computer. In some embodiments, the one or more changes in the source code of the software application may be automatically retrieved from the user device and/or transmitted to the server computer.

Further, at 710, the method 700 may include a step of incrementally updating, using the processing device, the comprehensive PDG to reflect one or more changes made in the source code. Initially, one or more incremental updates may be made in the one or more mPDGs in the face of modifications to the underlying codebase through one or more appropriate algorithms. The incremental updates made in the one or more mPDGs may represent changes in the one or more data dependencies and control dependencies in the one or more modules of the source code. The incremental updates may be made on top of the existing mPDGs. Accordingly, the incrementally updated mPDGs may be combined to make one comprehensively updated PDG representing the entire source code, which may represent incremental updates in the one or more control and data dependencies across the one or more modules in the entire source code.

Further, at 712, the method 700 may include a step of searching, using the processing device, the mPDG based on search expressions associated with the one or more changed lines.

Further, at 714, the method 700 may include a step of transmitting, using the communication device, source code line matches to facilitate change impact analysis. The incrementally updated comprehensive PDG may be transmitted to the connected device, whereby, by viewing the incremental updates, change impact analysis may be performed and potential consequences of the one or more changes made to the source code of the software application may be analyzed.

FIG. 10 is an exemplary representation of a system 1000 to facilitate modular dependency graph construction or update, in accordance with some embodiments. Accordingly, Source code files are syntactically processed to identify the "modules" therein and subsequently to identify and categorize the syntactic elements within each module. A module here may be defined as source code written in a single language contained in a single file. Further, Modules may be contiguous within a single file, contiguous within a portion of a single file, or contain an "enclave" written in a different language. Further, an enclave here may be defined as a segment of source code, written in one programming language, that may be embedded within a segment of source code written in a different programming language.

Further, the system 1000 may include a File versioning data store 1002. Accordingly, the File versioning data store 1002, in an instance, may be a data store organized on a per-file basis, which may be configured for recording: the identifier for the file; the identifiers for all versions of that file; and the contents of each file version, either as a complete record of the contents or as the record of the changes to the contents (i.e., as a delta). Each version may be marked as "done", "new", or "changed". This data store may be indexed to permit fast access to "new" and "changed" file versions.

Further, the system 1000 may include a Language characteristics data store 1004. Further, the Language characteristics data store 1004, in an instance, may be a data store organized on a per-language-dialect basis, which may be configured for recording: identifier of language; identifier of dialect; specification of standard file extension(s); specification of kind of "enclaves" supported; identifier of parser(s) appropriate to each dialect and each enclave. Further, each record on this data store may be annotated as "done" or "new."

Further, the system 1000 may include a Parsed, language-identified source-code module data store 1006. Further, the Parsed, language-identified source-code module data store 1006, in an instance, may be a data store organized on a per-file-version-basis, which may be configured for recording: identifiers of files; identifiers of file-versions; descriptors for the modules in each file; the language in which the module is written, as identified by a concrete parser; and a parsed representation of the syntactic structures present within each module, as defined by the language in which the module is written, and as identified by the same concrete parser. For example, a standard abstract syntax tree for these structures. Further, each module in a file-version can be numbered in order, be given a description indicating its starting position in terms of character offset, or be given a syntactic description indicating the relative position of the module with respect to other modules. Each version may be marked as "done", "new", or "changed." This data store may be indexed to permit fast access to "new" and "changed" file versions.

Further, the system 1000 may include a Syntactic characteristics data store 1008. Further, the Syntactic characteristics data store 1008, in an instance, may be a data store organized on a per-parser basis, which may be configured for recording: identifiers of parsers; syntactic elements supported by the parser corresponding to declarations and syntactic elements corresponding to references; the identifier of the parser's procedure to select the identifying identifier(s) of the declaration or reference. For example, a "Class Declaration" would be a syntactic element supported by a typical parser for the Java programming language, constituting a form of declaration, whose simple name can be found as a string embedded at a particular point within the syntactic element, but whose alternative name (the fully qualified name) can be determined on the basis of a "Package Declaration" that appears prior to the Class Declaration in a Java source file.

Further, the system 1000 may include a Modular dependency graphs data store 1010. Further, the Modular dependency graphs data store 1010, in an instance, may be a data store organized on a per-module basis, recording: the identifier of the module; the identifier of the file and the modifier of the file-version in which the module resides; identifier of language and dialect; graph consisting of nodes representing key processing elements in the module (i.e., expressions in a typical language) and key data flowing through the module (this graph is the standard notion of a so-called program dependence graph). Nodes in the graph can possess annotations recording whether a node is "external" or "local" plus syntactic clues as to external references and the kind of technology in use; such annotations are created and used at later phases. Each module is marked as "done", "new", or "changed". This data store is indexed to permit fast access to "new" and "changed" modules.

Further, the system 1000 may include Source code file(s) 1012 Standard technology. Each file may possess a unique identifier. Each file may optionally possess a version identifier. Files may be explicitly designated as deleted.

Further, the system 1000 may include Granularity specification 1014. Further, the Granularity specification 1014, in an instance, may be an input from the user, external program or both as to whether the analysis should proceed as fine-grained or coarse-grained.

Further, the system 1000 may include a Versioning analyzer 1016. Further, the Versioning analyzer 1016 may compare input source code file(s) against file versions stored in the file versioning data store 1002, using standard lexical comparison techniques. Further, explicitly deleted files may be handled identically to non-deleted files for later processing steps. Further, there may be three cases to consider. In one instance, a file may be presented without a version identifier. Further, in another instance, a file may be presented with a version identifier that may differ from existing ones for that file. Further, in another instance, a file may be presented with a version identifier that may be identical to one that may exist for a version of that file.

Further, for files presented without a version identifier, the most recent version of the file may be located in the file versioning data store 1002. If a new version may be different than that most recent version, it may be assigned a new version identifier that respects the temporal ordering constraint that the new version identifier should be more recent than the previously most recent version identifier. The new version may be stored in the file versioning data store 1002 and marked as new. Otherwise, the file may be ignored.

Further, for files presented with a version identifier that may differ from existing ones, the new file version may be stored in the file versioning data store 1002 and marked as new.

Further, for files presented with a version identifier that may be identical to an existing one, the new file version may replace the existing version and may be marked as changed.

Further, the system 1000 may include a Language-specific parsers 1018 Standard technology.

Further, the system 1000 may include a Language classifier/module analyzer 1020. Further, the Language classifier/module analyzer 1020 may operate on "new" and "changed" file versions located in the file versioning data store 1002. Responsible for subdividing each such file version into "modules", the language of each of which is known, along with a representation of the syntactic elements in each module (standard technology such as abstract syntax trees), calculated via standard parser technology (ANTLR grammar, JavaCC grammar, etc.). Further, selection of the appropriate parser may be performed by leveraging the file extension for the most likely target (e.g., ".java" for source code files written in the Java programming language). Further, selection of the appropriate parser may be performed in order of popularity. Further, when an initial language selection leads to failed parsing, the next option may be selected. To deal with "enclaves", the module language's support for enclaves may be recorded in the language characteristics data store 1004 (e.g., source files for the Java programming language can only support enclaves containing instructions for the SQL database query standard within text string literals). Further, all apparent enclaves may then be parsed in a second phase associated with FIG. 11 (e.g., all text string literals in a source code file written in Java may then be parsed as potential SQL statements). Further, some languages support direct embedding of enclaves, the language characteristics data store 1004 may indicate such cases, where standard island grammar technology may be used to permit the outer module to be parsed while the enclave may be left to the second phase. This process may continue recursively to support deeply nested enclaves. Further, an output may consist of a set of modules, the language in which each module may be written, and a representation of the syntactic elements in each module, stored within the parsed, language-identified source-code module data store 1006 according to the file identifier and version identifier of the file version being processed, equivalent to three cases used by the versioning analyzer 1016. Explicitly deleted files may be processed more simply, since no parsing may be required or appropriate.

Further, the system 1000 may include a Modular dependency analyzer 1022. Further, the Modular dependency analyzer 1022 may operate on "new" and "changed" modules located in the parsed, language-identified source-code module data store 1006. Identification of program elements representing declared entities ("declarations") and program entities representing references to those declared entities ("references") and possibly to external program entities (final determination of local versus external reference may be calculated in second phase as shown in FIG. 11). Further, a kind of syntactic elements that may represent declarations and references within each language may be encoded in the syntactic characteristics data store 1008, used in this process, along with the file identifier, version identifier, and module identifier, equivalent to three cases used by the versioning analyzer 1016. Further, explicitly deleted files may not require detailed analysis.

Further, the system 1000 may include a Language-specific semantic analyzer 1024. Further, the Language-specific semantic analyzer 1024 may operate in a coarse-grained or fine-grained manner. For fine-grained analyses, the specific control-flow and data-flow relationships between declarations and references may be calculated within each module by a language-specific semantic analyzer 1024 and translated into a common dependency graph model, to be stored in the modular dependency graphs data store 1010. For coarse-grained analyses, dependencies between references and declarations may be calculated within each module by a language-specific semantic analyzer 1024 and translated into a common dependency graph model, to be stored in the modular dependency graphs data store 1010.

Further, with reference to FIG. 10, FIG. 11, FIG. 12, FIG. 13, and FIG. 14, dashed arrows may represent data flow and solid arrows may represent control flow.

FIG. 11 is an exemplary representation of a system 1100 to facilitate annotation of dangling references and referable declarations for heterogeneous systems. Further, the individual modular dependency graphs may further be annotated as to their dangling references (which must ultimately refer to other modular dependency graphs) and declarations that may be referenced by other modular dependency graphs.

Further, the system 1100 may include a Technology characteristics data store 1102. Further, the Technology characteristics data store 1102, in an instance, may be a data store organized on a per-language basis, which may be configured for recording the identifier of the language, the identifier(s) of the specific technology(ies) to be found there, and details of syntactic clues to be found in the language (e.g., the presence of particular names occurring in specific syntactic constructs, the presence of specific keywords).

Further, the system 1100 may include a Parsed, language-identified source-code module data store (such as the Parsed, language-identified source-code module data store 1006) and Modular dependency graphs data store (such as the Modular dependency graphs data store 1010).

Further, the system 1100 may include a Technology analyzer 1104. Further, the Technology analyzer 1104, in an instance, may operate on "new" and "changed" modules in the parsed, language-identified source code module data store 1006. Further, the Technology analyzer 1104, in an instance, may identify technology used within each module, by discovering the presence of syntactic clues there. Further, reference to an external library, when syntactically unambiguous, may be one such clue; the use of language defined protocols (e.g., the Java Native Interface in the Java language) may be another. Further, the information stored in the technology characteristics data store 1102 may be leveraged for this process. Further, clues to target declarations referenced by external references in modules may be stored as annotations on the representations of those external references, within the modular dependency graphs data store 1010 for the pertinent file, file version, and module.

Further, the system 1100 may include an External references and exposure analyzer 1106. Further, the External references and exposure analyzer 1106, in an instance, may operate on "new" and "changed" modules in the modular dependency graphs data store 1010 to find declarations that may be exposed externally via each communication technology, and references that do not correspond to declarations within a module but are exposed externally via each communication technology (i.e., dangling references). These declarations and references may be annotated within the modular dependency graphs data store 1010 as potential connection points.

FIG. 12 is an exemplary representation of a system 1200 to facilitate change impact analysis for heterogeneous systems, in accordance with some embodiments. Accordingly, a partial, global dependency graph may be computed as needed on demand in order to compute the change impact analysis for an entire heterogeneous system.

Further, the system 1200 may include a Modular dependency graphs data store (such as the Modular dependency graphs data store 1010 from Phase 1 and modified in Phase 2), and the Parsed, language-identified source code module data store 1006 from Phase 1.

Further, the system 1200 may include an LTL triplets characteristics data store 1202. Further, the LTL triplets characteristics data store 1202, in an instance, may record characteristics of interconnections between modules written in two specific languages and mediated by a specific technology (language-technology-language or LTL triplets).

Further, the system 1200 may include an Impacted dependency graphs data store 1204. Further, the Impacted dependency graphs data store 1204, in an instance, may be a data store organized on a per-system-version basis, which may be configured for recording the identifier of the system 1200, a portion of the global dependency graph of the system 1200 that has been computed as impacted, annotations on the nodes in the impacted dependency graph of the system 1200 to indicate seed changes 1206.

Further, the Seed changes 1206, in an instance, may be an input from a user, external program, or both to indicate which initial nodes may be changed, in order to compute subsequent, probably impacted nodes. Includes a specification of the system version under analysis.

Further, a configuration specification (such as heuristics configuration specification 1208), in an instance, may be an input from a user, external program, or both to indicate how to configure the heuristic approaches applied by the processes.

Further, the system 1200 may include a Module interconnections analyzer 1210. Further, the Module interconnections analyzer 1210 may operate on modules in the modular dependency graphs data store 1010 when prompted by a change impact analyzer 1212. Further, this process may be configured to utilize different selection mechanisms, for example, to consider a globally optimal solution, to consider only dangling references and unused external declarations on a global basis, or to prefer interconnections between references and declarations collocated within the same file. Further, a module with an external reference may interconnect with a module with an external declaration only if communication between the modules might be mediated by a shared technology that may support any needed translation between the form of the declaration (i.e., its identifier) and the form of the reference. Further, each technology may transform names and other forms of identification to translate between the needs of the languages used in the modules being interconnected, such transformation rules may be stored in the LTL triplets characteristics data store 1202 for use at this step. Further, inter-module communication technologies may be standard for a language (e.g., the Java Native Interface for communicating between modules written in Java and ones written in C/C++) or may be a specific choice of the software developer. Further, the module interconnections analyzer 1210 may then combine the modular dependency graphs according to the identified interconnections, to form a global dependency graph for an entire heterogeneous software system; this may be stored in a global dependency graphs data store with a unique system-version identifier. Further, analysis results may be annotated in the modular dependency graphs data store 1010. Further, an analyzer may locate these cached results and reuses them unless changes to the system require re-computation of previously calculated module interconnections.

Further, the system 1200 may include the Change impact analyzer 1212. Further, the Seed changes 1206 within a software system may be indicated by user annotations of individual modular dependency graphs, programmatic annotation derived from actual changes that have occurred, or both. Further, the change impact analyzer 1212 may derive portions of individual modular dependency graphs that may be impacted by the seed changes 1206, and propagates such impacts to other modular dependency graphs by communicating with the module interconnections analyzer 1210 to interpret where any and all dangling references refer to in other modular dependency graphs. Further, a complete result may be recorded in the impacted dependency graphs data store 1204 as a dependency graph of the part of the software system that may be predicted to be impacted. Further, the dependency graph, in an instance, may be visualized. Further, the dependency graph, in an instance, may be used programmatically to provide a list of impacted files and line numbers. Further, the dependency graph, in an instance, may highlight the impacted portions of the source code within a source code editor. Further, this process may be configured in various ways, e.g., to assume 100% probability of impact from a seed change to its dependent nodes; to use probability annotations on the directed edges according to the approach described in Walker et al. 2006 [Robert J. Walker, Reid Holmes, Ian Hedgeland, Puneet Kapur, and Andrew Smith. A lightweight approach to technical risk estimation via probabilistic impact analysis. In Proceedings of the 3rd International Workshop on Mining Software Repositories (MSR '06), 28th International Conference on Software Engineering, pages 98-104, 2006. doi: 10.1145/1137983.1138008]; to use a constant probability value for the impact; or to use a heuristic value calculated by standard software metrics acquired from measuring the system under analysis. Further, a manner in which the process may be configured is taken as an input from the configuration specification.

Further, the system 1200 may include an Interaction and filtering support 1214. Accordingly, a user may interact with the graph visually or programmatically to alter the view to temporarily or permanently eliminate impacted nodes from the graph. Further, a remainder of the impacted graph may be readjusted accordingly. Further, the user may choose to undo any temporary changes, individually or as a whole. Further, the user may alter configurations (which may alter the configuration specification) which reruns the change impact analyzer 1212 when necessary or otherwise simply alters the view of the results.

FIG. 13 is an exemplary representation of a recommendation system 1300 for language characteristics support, in accordance with some embodiments. Accordingly, a recommendation system may be provided to assist a developer in providing specifications for language characteristics data appropriate for inclusion in the language characteristics data store and in providing new language-specific parsers.

Further, the recommendation system 1300 may include a Language characteristics data store 1004 from Phase 1.

Further, the recommendation system 1300 may include a Partial language characteristics specification 1302. Further, the Partial language characteristics specification 1302, in an instance, may be a new but incomplete data record regarding a language not already stored in the language characteristics data store.

Further, the recommendation system 1300 may include a Language-specific parser(s) 1018 from Phase 1, except that those processes may be used as data within this phase.

Further, the recommendation system 1300 may include Sample file(s) 1304. Further, the Sample file(s) 1304, in an instance, may be similar to the source code file(s) 1012 from Phase 1, except that these should only contain source code written in the programming language of interest.

Further, the recommendation system 1300 may include a Language characteristics recommender 1306. Further, the Language characteristics recommender 1306, in an instance, may operate on the partial language characteristics specification 1302 to provide suggestions for how to complete it. Further, the Language characteristics recommender 1306, in an instance, may utilize similarities with existing languages within the language characteristics data store 1004 to compute such suggestions. For example, a new dialect of a language may likely share most of the characteristics of existing dialects of that language, so recommending such choices to the user may be appropriate. Further, when more than one possibility may exist, each recommendation may be provided with a weighting score and the recommendations may be ordered accordingly. Further, a missing identifier of the dialect may be recommended as the language identifier plus a suffix. Further, missing file extensions may duplicate those of the base language or compute commonalities amongst all the dialects for the language or find patterns in the extension naming conventions and the identifiers of the dialects. Further, the Language characteristics recommender 1306, in an instance, may interact with the user to complete the specification. Further, the user may accept recommendations, manually provide missing details, cancel the operation, or store the completed specification in the language characteristics data store 1004. Further, newly stored specifications may be annotated as new.

Further, the recommendation system 1300 may include a Parser recommender 1308. Further, the Parser recommender 1308, in an instance, may operate on the partial language characteristics specification 1302 to compute recommendations for the parser to be used for the new language. Further, in situations where the existing language-specific parser(s) 1018 encoded as a grammar specification (standard technology) similar languages may be found and the grammar specifications for their parsers may be suggested as starting points for a new parser, providing more refined indications of areas that are most likely to require adjustment. Further, in all situations, this process may also attempt to parse all the sample file(s) 1304 with the recommended parsers to highlight which parts of the sample file(s) 1304 do not parse successfully and which parts of the recommended parsers lead to those problems. Further, such indications are thus recommendations for points for adjustment within the existing parsers.

FIG. 14 is an exemplary representation of a recommendation system 1400 for syntactic characteristics support, in accordance with some embodiments. Accordingly, the recommendation system 1400 may be provided to assist the developer in providing specifications for syntactic characteristics data appropriate for inclusion in the syntactic characteristics data store 1008 and in providing new language-specific semantic analyzers.

Further, the recommendation system 1400 may include the Language characteristics data store 1004 from Phase 1 and the Syntactic characteristics data store 1008 from Phase 1.

Further, the recommendation system 1400 may include a Language-specific parser(s) (such as the Language-specific parser(s) 1018 from Phase 1, except that those processes may be used as data within this phase).

Further, the recommendation system 1400 may include a Language-specific semantic analyzer(s) (such as the Language-specific semantic analyzer(s) 1024 from Phase 2, except that those processes are used as data within this phase).

Further, the recommendation system 1400 may include a Syntactic characteristics recommender 1402. Further, the Syntactic characteristics recommender 1402, in an instance, may operate on "new" records in the language characteristics data store 1004. Further, the Syntactic characteristics recommender 1402, in an instance, may utilize similarities with "done" records within the language characteristics data store 1004 and the syntactic characteristics data store 1008 to compute recommendations. Specifically, similarities with syntactic entities in syntactic characteristics records may indicate whether a syntactic entity arising from a "new" record should be recommended as a declaration or reference (or explicitly as neither). Further, possessing the identical identifier of a syntactic entity may be judged a strong indicator that the same classification should be recommended. Further, strong similarity or dissimilarity in the context of use of a syntactic entity as evidenced by the language-specific parser(s) 1018 may also weigh for or against these recommendations. Further, the Syntactic characteristics recommender 1402, in an instance, may interact with the user to define a new record; the user may accept recommendations, manually provide details, cancel the operation, or store the completed specification in the syntactic characteristics data store 1008, which may also cause the record in the language characteristics data store 1004 to be updated to "done." Further, newly stored specifications may be annotated as new in the syntactic characteristics data store 1008.

Further, the recommendation system 1400 may include a Semantic analyzer recommender 1404. Further, the Semantic analyzer recommender 1404, in an instance, may operate on "new" records in the syntactic characteristics data store 1008. Further, the Semantic analyzer recommender 1404, in an instance, may recommend existing language-specific semantic analyzers based on similarities between syntactic characteristics records. Differences between the "new" record and records forming the basis for recommendations are used to highlight areas of the existing semantic analyzer that ought to be investigated for adjustment. Further, when complete, updates the record in the syntactic characteristics data store 1008 to "done".

Further, in some embodiments, an exemplary embodiment of the system is disclosed to facilitate fast and maintainable change impact analysis through the generation of modularized program dependency graphs, including identification of modules written in different languages. The system may include a language classifier/module identifier, which may be responsible for subdividing a set of files into "modules", the language of each of which may be known, along with a representation of one or more syntactic elements in each module such as through abstract syntax trees, that may be calculated via standard parser technology (such as ANTLR grammar, JavaCC grammar, etc.). The one or more modules may be contiguous within a single file, contiguous within a portion of a single file, or contain an enclave written in a different language. The selection of an appropriate parser may be performed by leveraging the file extension for a most likely target (e.g., ".java" for source code files 1514 written in the Java programming language) and in order of popularity. If an initial language selection leads to failed parsing, a next option may be selected. To deal with "enclaves" that may be segments of source code written in one programming language, embedded within a segment of source code written in a different language, support of a language of the module for one or more enclaves in the module may be recorded in a language characteristics data store (e.g., source code files 1514 for the Java programming language may only support enclaves containing instructions for the SQL database query standard within text string literals). All apparent enclaves may then be parsed in a second phase (e.g., all text string literals in a source code file 1514 written in Java may then be parsed as potential SQL statements). Some languages may support direct embedding of enclaves, which may be indicated by language characteristics data store, where island grammar technology may be used to permit the outer module to be parsed while the enclave may be left to the second phase. This process may continue recursively to support deeply nested enclaves. The output may consist of a set of modules, the language in which each module may be is written, and a representation of the syntactic elements in each module. Further, a modular dependency analyzer may be responsible for determining one or more dependencies within each module from references to declarations. The kinds of syntactic elements that may represent declarations and references within each language may be encoded and recorded in a syntactic characteristics data store. Specific declarations and references may be calculated within each module by a language-specific semantic analyzer and translated into a common dependency graph model, to be stored in the modular dependency graphs data store.

Figure 15:
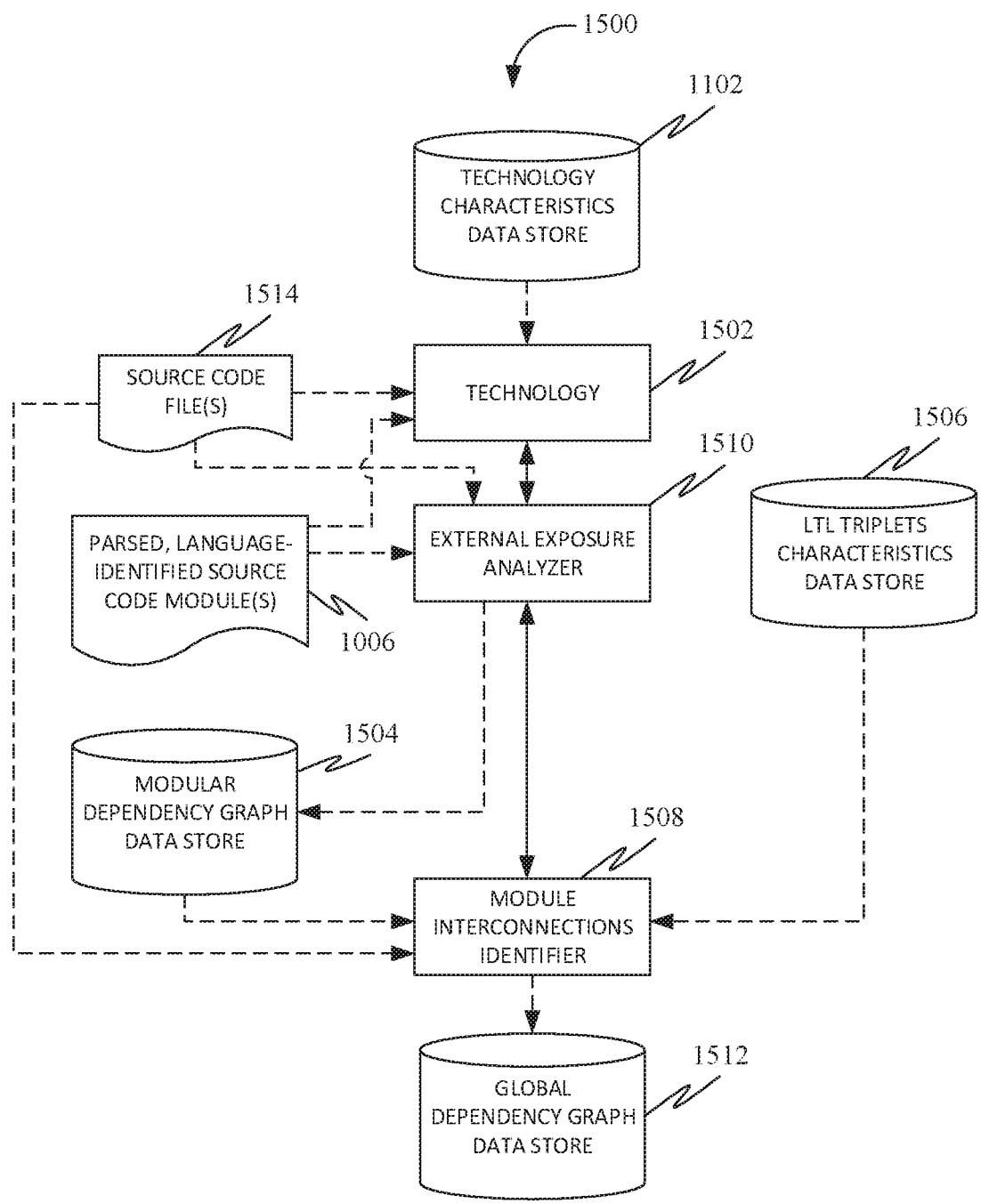
FIG. 15 shows an exemplary embodiment of a system to facilitate fast and maintainable change impact analysis through the generation of modularized program dependency graphs, including identification of communication technologies used to interconnect modules, in accordance with some embodiments.

Further, FIG. 15 shows an exemplary embodiment of a system 1500 to facilitate fast and maintainable change impact analysis through the generation of modularized program dependency graphs, including identification of communication technologies that may be used to interconnect modules. Multiple communication technologies may be used within one software system. A technology identifier (such as technology identifier 1502) may identify a technology used between each pair of intercommunicating modules, by discovering the presence of syntactic clues within each module. Further, a modular dependency graphs data store 1504 may be leveraged to find declarations that may be exposed externally (using an external exposure analyzer 1510) via each communication technology references that may not correspond to declarations within a module but may be exposed externally via each communication technology. Further, such declarations and references may be annotated within the modular dependency graphs store 1504 as potential connection points with an indication of the technology mediating the potential interconnection. Characteristics of interconnections between modules written in two specific languages and mediated by a specific technology (language-technology-language or LTL triplets) may be recorded in an LTL triples characteristics data store 1506. A module interconnections identifier 1508 may determine connections between two specific modules, in that exposed references in one module may be dependent on an exposed declaration in another module when mediated by a specific technology used in both modules. Each technology may transform names and other forms of identification to translate between the needs of the languages used in the modules being interconnected. Such transformation rules may be stored in the LTL triples characteristics data store 1506 for use. Inter-module communication technologies may be standard for a language (such as Java Native Interface® for communicating between modules written in Java and ones written in C/C++) or may be a specific choice of a software developer. The module interconnections identifier 1508 may combine modular dependency graphs according to identified interconnections, to form a global dependency graph (that may be stored in a global dependency graph data store 1512) for an entire heterogeneous software system.

Figure 16:
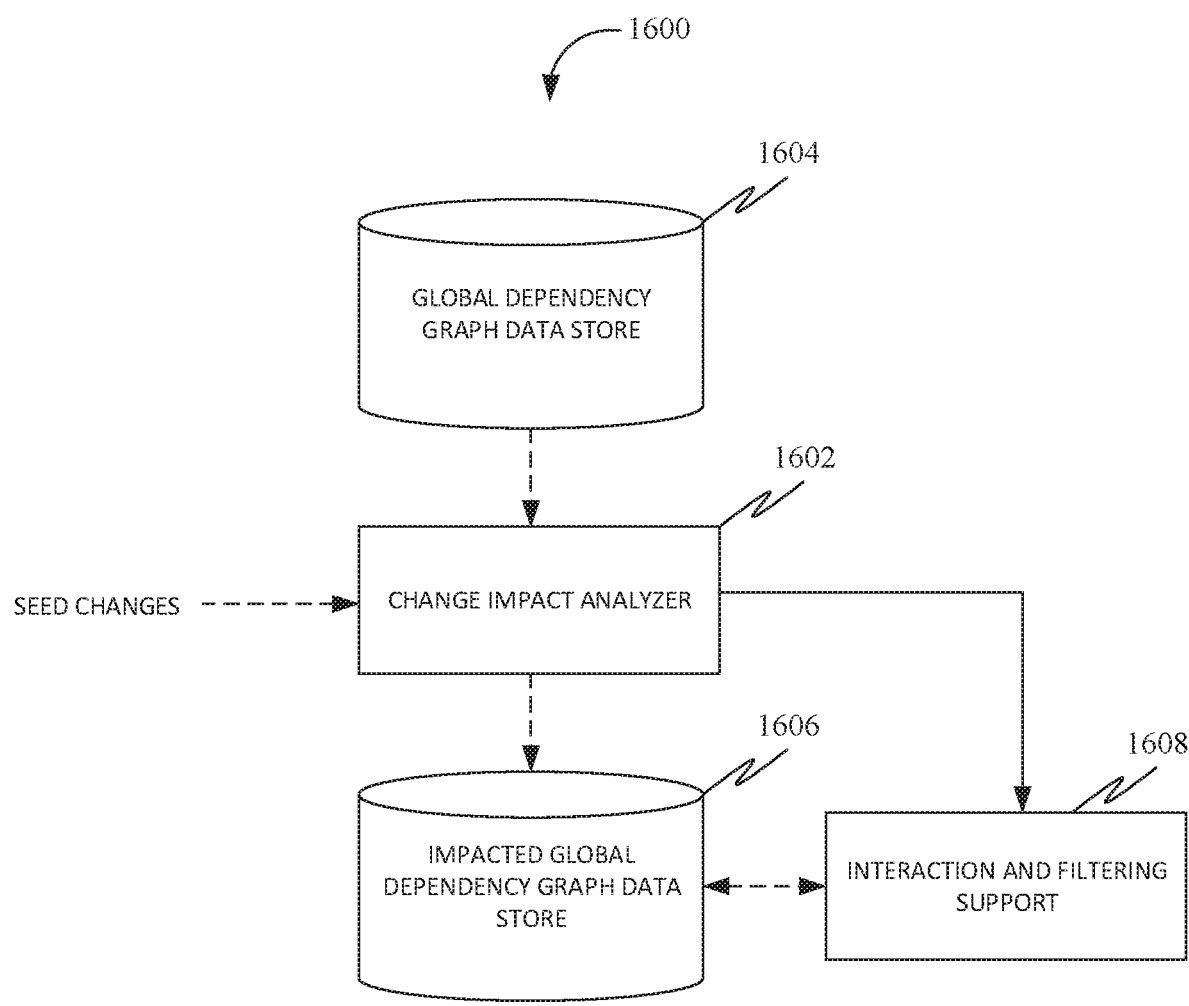
FIG. 16 shows an exemplary embodiment of a system to facilitate fast and maintainable change impact analysis through the generation of modularized program dependency graphs, in accordance with some embodiments.

FIG. 16 shows an exemplary embodiment of a system 1600 to facilitate fast and maintainable change impact analysis through the generation of modularized program dependency graphs, in accordance with some embodiments. Seed changes within a global dependency graph (that may be stored in the global dependency graph data store 1604) may be indicated by user annotation of global dependency graph, programmatic annotation derived from actual changes that may have occurred, or both. Further, a change impact analyzer 1602 may derive portions of the global dependency graph that may be impacted by the seed changes. Further, a result may be recorded in an impacted global dependency graph data store 1606. The result may be visualized, may be used programmatically to provide a list of impacted files and line numbers, and may highlight the impacted portions of the source code within a source code editor. In some embodiments, a user may be able to interact (e.g. through an interaction and filtering support 1608) with the one or more presentation means to alter a view or to temporarily or permanently eliminate impacted nodes from global dependency graph. The remainder of the impacted graph may be readjusted accordingly. The user may choose to undo any of these changes, individually or as a whole.

Figure 17:
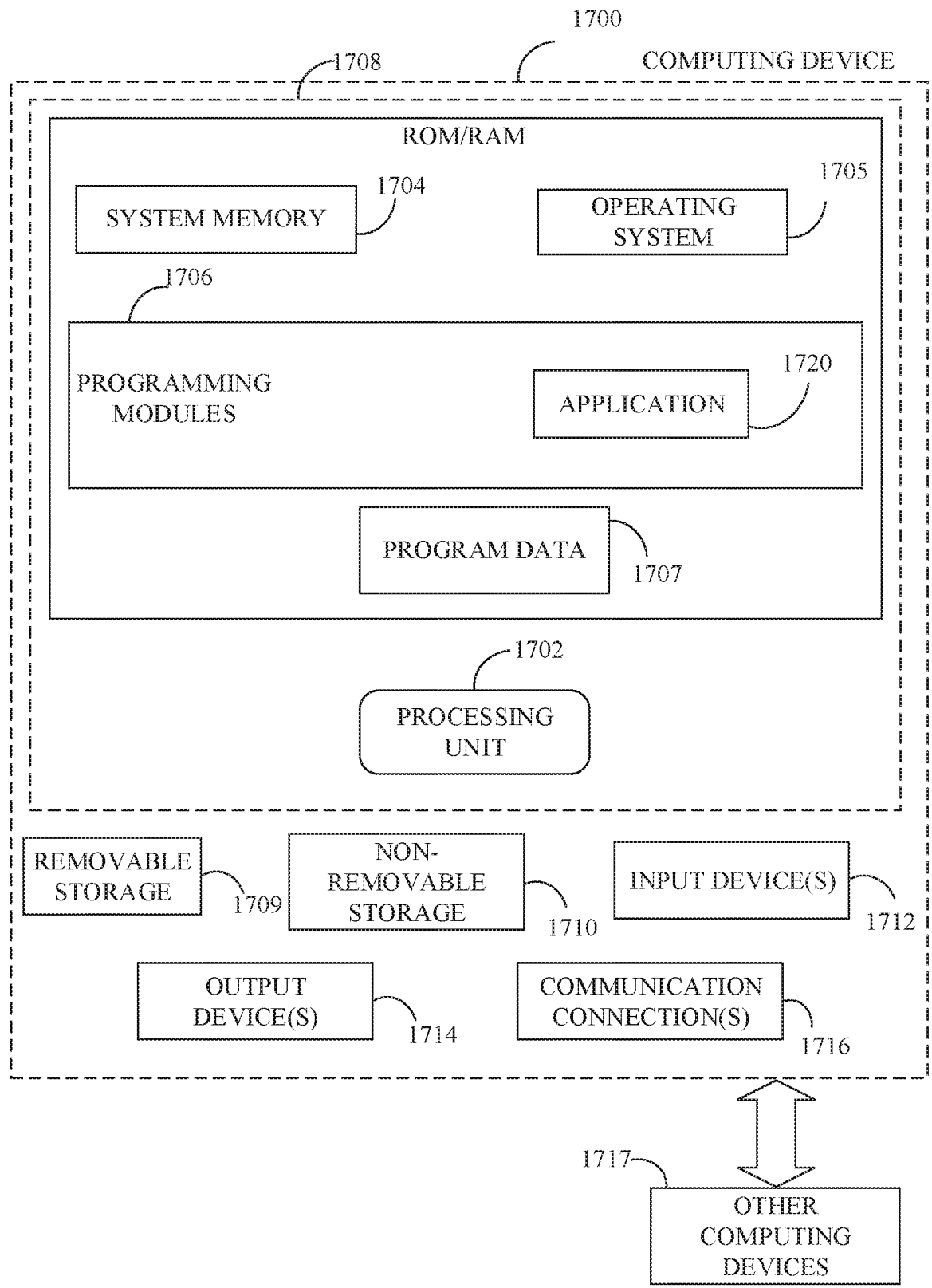
FIG. 17 is a block diagram of a computing device for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may comprise, but is not limited to, volatile (e.g. random-access memory (RAM)), non-volatile (e.g. read-only memory (ROM)), flash memory, or any combination. System memory 1704 may include operating system 1705, one or more programming modules 1706, and may include a program data 1707. Operating system 1705, for example, may be suitable for controlling computing device 1700's operation. In one embodiment, programming modules 1706 may include image-processing module, machine learning module. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and non-volatile, removable and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1706 (e.g., application 1720 such as a media player) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

APPENDIX - A

```
input: model, the call graph and mPDGs; node. the seed node;
       distance, threshold of distance
output: a set of graph nodes
1   slice ← { } cache ← { }
2   crit ←(node, 0. 0. 0)
    /*(seed, distance, impactedOutputs, impactedFields) */
3   queue, enqueuer(crit)
4   while queue. isNotEmpty( ) do
5       crit ← queue. dequeue( )
6       sliceDown( model, queue, crit, distance, slice, cache)
7       if crit.impactedOutputs. isEmpty( ) then continue
8       callee ←crit.seed, method
9       foreach caller ∈ model. getCaller(callee) do
10          foreach cs ∈ model. getCallSite( caller, callee) do
11              aps ← cs. toActuaK c. impactedOut puts)
12              foreach ap ∈ aps do
13                  c ← (ap, crit.distance + 1)
14                  queue, enqueuer(c)
15  Return slice
```

APPENDIX - B

```
input: model, the call graph and niPDGs; critQ,
       queue of criteria: crit, current slicing criterion;
       dist, threshold of distance; slice, global slice;
       cache, cache of impacted output of criteria
       and used fields
1   if crit. distance > dist then return
2   seed ← crit.seed
3   if cache. containsSeed(seed) then
4       crit .impactedOutputs ← cache. result(seed)
5       Return
6   g ← model. getPdg(seed. method) intraSlice ← { }
7   queue, enqueue(seed)
8   while queue. isNotEmpty( ) do
9       node ← queue. dequeue( )
10      if intraSlice. contains (node) then continue
11      intraSlice. add (node)
12      if isCallSite(node) then
13          foreach entry ∈ node. getCalleesQ do
14              c ← (entry, crit.distance + 1)
15              sliceDown (model. critQ. c. dist. slice, cache)
16              aps ← node. toAciual(c.impactedOutputs)
17              foreach ap ∈ aps do
18                  queue, enqueue(ap)
19      else if isActualIn(rtode) then
20          cs ← node, parent
21          fps ← cs. toFormal( node)
22          foreach fp ∈ fps do
23              c ← (fp. crit .distance + 1)
24              sliceDown (model* critQ. c. dist. slice, cache)
25              aps ← cs. toActual(c.impactedOutputs)
26              foreach ap e aps do
27                  queue, enqueue(ap)
28      else if isFormalOut(node) then
29          if isField(node.data) then
30              crit.impactedFields. add(node)
31          else if isParameter(node.data) then
32              crit. impactedOutputs. add(node)
33      else
34          alias ← findAlias(model, node. newCache( ))
35          foreach a e alias do
36              if isField(a.c/a/a) then
37                  crit .impactedFields. add (a)
38              else
39                  crit .impactedOutputs. add(a)
```

APPENDIX - B

```
40      else
41        foreach nb e g. outgoingNeighbours(node) do
42          queue, enqueue(nb)
43      slice. union( intraSlice)
44      cache. add( seed, crit .impactedOutputs)
45      foreach f € crit .impactedFields do
46        if cache. containsField(f .data) then continue
47        cache. addField(f. data)
48        foreach node e model. findReference(f. data) do
49          c ← (node, crit .distance + 1)
50          critQ. enqueue(c)
```

APPENDIX - C

```
input: model, the call graph and mPDGs; node, the data node;
       visited, cache of visited node
       output: a set of aliases
1      alias ← { }
2      data ← node, data
3      if isPrimitive(data.type) then
4        return alias;
5      g ← model. getPdg( node, method)
6      foreach nb e g. incomingNeighbours(node) do
7        if visited, contains (nb) then continue
8        visited, add (nb)
9        if isFormalIn(nb) then
10         alias, add (nb)
11       else if isSimple (nb) ∧ nb.lhs.data == data then
12         t ← findAlias (model, nb.rhs, visited)
13         alias, union(t)
14       else if isCallSite(nb) ∧ nb.lhs.data == data then
15         foreach entry e nb. getCallees( ) do
16           ret ← entry, return
17           t ← findAlias( model, ret, visited)
18           foreach n € t do
19             if isField( n.data) then
20               alias, add(n)
21             else
22               act ← nb. toActual(n)
23               s ← findAlias( model, act, visited)
24               alias, union(s)
25       else if isActualOut(flb) then
26         cs ← nb.parent
27         fps ← cs. toFormal(nb)
28         foreach fp € fps do
29           t ← findAlias( model, fp, visited)
30           foreach n € t do
31             if isField(n.data) then
32               alias, ad(n)
33             else
34               act ← cs. toActual(n)
35               s ← findAlias (model, act, visited)
36               alias, union(s)
37     return alias
```

APPENDIX - D

```
1      class A {
2      String msg;
3        Boolean b;
4
5        static void driver (A a) {
6          StringBuilder sb = new StringBuilder( );
7          a.m1 (sb);
8          System.out.print(b);
9          boolean b = a.m2(0;
10         System.out.print(sb);
11       }
12
13       void m1 (StringBuilder sb) {
14         sb.append(msg);
```

APPENDIX - D

```
15         b = true;
16       }
17
18       boolean m2( ) {
19         return b;
20       }
21     }
```

What is claimed is:

1. A method for facilitating Change Impact Analysis (CIA) using modular program dependency graphs, wherein the method comprises:
receiving, using a communication device, a source code for a software application and one or more changed lines corresponding to the source code from a user device;
analyzing, using a processing device, the source code to determine one or more modules within the source code, wherein the analyzing further comprises: determining, using the processing device, one or more programming languages associated with the source code by using a language characteristics data retrieved from a language characteristics data store; parsing, using the processing device, the source code based on the determining of the one or more programming languages to identify the one or more modules within the source code; and identifying, using the processing device, one or more syntactic elements within each module of the one or more modules based on at least one of a syntactic characteristics data retrieved from a syntactic characteristics data store, and a language-specific semantic data retrieved from a semantic data store;
generating, using the processing device, one or more modular Program Dependency Graphs (mPDGs) based on the analyzing, wherein a mPDG in the one or more mPDGs corresponds to a module of the one or more modules;
updating, using the processing device, at least one mPDG in the one or more mPDGs based on the one or more changed lines to obtain at least one updated mPDG;
searching, using the processing device, the mPDG based on search expressions associated with the one or more changed lines;
calculating, using the processing device, one or more impacted lines of the source code based on the searching; and
transmitting, using the communication device, the one or more impacted lines from the source code associated with the software application to the user device.

2. The method of claim 1, wherein the source code is written in one or more programming languages.

3. The method of claim 1, wherein the module of the one or more modules is a set of one or more program statements associated with the source code, wherein each program statement of the one or more program statements is at least one of a data dependency statement and a control dependency statement.

4. The method of claim 1, wherein the mPDG of the one or more mPDGs is a representation of the module, wherein the representation comprises a directed acyclic graph structure comprising a root node and one or more child nodes, wherein the root node is associated with a name of the module, wherein the root node is connected to the one or more child nodes through one or more branches, wherein each child node of the one or more child nodes is associated with at least one program statement of the module.

5. The method of claim 1, wherein the generating of the one or more mPDGs further comprises:
producing, using the processing device, the one or more mPDGs corresponding to the one or more modules based on the identifying of the one or more syntactic elements within each module of the one or more modules; and
storing, using a storage device, the one or more mPDGs in a persistent modular dependency graph data store.

6. The method of claim 1, wherein the language characteristics data store is configured to store at least one of an identifier of the programming language, an identifier of a dialect, a specification of standard file extension, and a specification of enclaves.

7. The method of claim 1, wherein the syntactic characteristics data store is configured to store at least one of an identifier of a parser, one or more syntactic elements corresponding to references, and one or more syntactic elements supported by the parser corresponding to declaration.

8. The method of claim 5, wherein the persistent modular dependency graph data store is configured to store an identifier of the module, an identifier of a file associated with the source code, an identifier of language and dialect, and the one or more mPDGs.

9. The method of claim 1, wherein the method further comprises:
identifying, using the processing device, a subset of mPDGs of the one or more mPDGs that may be used in calculating the impacted lines of source code, according to their control dependencies and data dependencies;
matching, using the processing device, one or more pairs of mPDGs of the subset of mPDGs so that one output of one mPDG of the subset of one or more pairs of mPDGs corresponds to one input of the other mPDG in the pair; and
calculating, using the processing device, one or more lines of source code that are predicted to be impacted from the one or more changed lines of source code, using the one or more mPDGs of the one or more mPDGs.

10. A system for facilitating Change Impact Analysis (CIA) using modular program dependency graphs, wherein the system comprises:
a communication device configured for:
receiving a source code for a software application and one or more changed lines corresponding to the source code from a user device; and
transmitting one or more impacted lines from the source code associated with the software application to the user device; and
a processing device configured for:
analyzing the source code to determine one or more modules within the source code;
generating one or more modular Program Dependency Graphs (mPDGs) based on the analyzing, wherein a mPDG in the one or more mPDGs corresponds to a module of the one or more modules;
updating at least one mPDG in the one or more mPDGs based on the one or more changed lines to obtain the at least one updated mPDG;
searching the mPDG based on search expressions associated with the one or more changed lines;
calculating one or more impacted lines of the source code based on the searching;
determining one or more programming languages associated with the source code by using a language characteristics data retrieved from a language characteristics data store;
parsing the source code based on the determining of the one or more programming languages to identify the one or more modules associated with the source code; and
identifying one or more syntactic elements within each module of the one or more modules based on at least one of a syntactic characteristics data retrieved from a syntactic characteristics data store, and a language-specific semantic data retrieved from a semantic data store.

11. The system of claim 10, wherein the source code is written in one or more programming languages.

12. The system of claim 10, wherein the module of the one or more modules is a set of one or more program statements associated with the source code, wherein each program statement of the one or more program statements is at least one of a data dependency statement and a control dependency statement.

13. The system of claim 10, wherein the mPDG of the one or more mPDGs is a representation of the module, wherein the representation comprises a tree structure comprising a root node and one or more child nodes, wherein the root node is associated with a name of the module, wherein the root node is connected to the one or more child nodes through one or more branches, wherein each child node of the one or more child nodes is associated with at least one program statement of the module.

14. The system of claim 10, wherein the processing device is further configured for producing the one or more mPDGs corresponding to the one or more modules based on the identifying of the one or more syntactic elements within each module of the one or more modules; and
a storage device configured for storing the one or more mPDGs in a persistent modular dependency graph data store.

15. The system of claim 10, wherein the language characteristics data store is configured to store at least one of an identifier of the programming language, an identifier of a dialect, a specification of standard file extension, and a specification of enclaves.

16. The system of claim 10, wherein the syntactic characteristics data store is configured to store at least one of an identifier of a parser, one or more syntactic elements corresponding to references, and one or more syntactic elements supported by the parser corresponding to declaration.

17. The system of claim 14, wherein the persistent modular dependency graph data store is configured to store an identifier of the module, an identifier of a file associated with the source code, an identifier of language and dialect, and the one or more mPDGs.

18. The system of claim 10, wherein the processing device is further configured for:
identifying a subset of mPDGs of the one or more mPDGs that may be used in calculating the impacted lines of source code, according to their control dependencies and data dependencies;
matching one or more pairs of mPDGs of the subset of mPDGs so that one output of one mPDG of the subset of one or more pairs of mPDGs corresponds to one input of the other mPDG in the pair; and
calculating one or more lines of source code that are predicted to be impacted from the one or more changed lines of source code, using the one or more mPDGs of the one or more mPDGs.

* * * * *